United States Patent
Natalenko et al.

(10) Patent No.: US 12,549,375 B2
(45) Date of Patent: *Feb. 10, 2026

(54) DEFINING AND MANAGING FORMS IN A DISTRIBUTED LEDGER TRUST NETWORK

(71) Applicant: BanQu, Inc., Minnetonka, MN (US)

(72) Inventors: Stanislav S. Natalenko, Kharkov (UA); Jeffrey A. Keiser, Minnetonka, MN (US); Ashish Gadnis, Austin, TX (US)

(73) Assignee: BanQu, Inc., Minnetonka, MN (US)

( * ) Notice: Subject to any disclaimer, the term of this patent is extended or adjusted under 35 U.S.C. 154(b) by 242 days.

This patent is subject to a terminal disclaimer.

(21) Appl. No.: 17/293,398

(22) PCT Filed: Nov. 12, 2019

(86) PCT No.: PCT/US2019/061002
§ 371 (c)(1),
(2) Date: May 12, 2021

(87) PCT Pub. No.: WO2020/102242
PCT Pub. Date: May 22, 2020

(65) Prior Publication Data
US 2022/0060330 A1 Feb. 24, 2022

Related U.S. Application Data

(60) Provisional application No. 62/760,789, filed on Nov. 13, 2018.

(51) Int. Cl.
*H04L 9/00* (2022.01)
*H04L 9/08* (2006.01)
(Continued)

(52) U.S. Cl.
CPC ............ *H04L 9/3239* (2013.01); *H04L 9/088* (2013.01); *H04L 9/3213* (2013.01);
(Continued)

(58) Field of Classification Search
CPC ..... H04L 63/062; H04L 9/088; H04L 9/3213; H04L 9/3236; H04L 63/0428;
(Continued)

(56) References Cited

U.S. PATENT DOCUMENTS

| | | |
|---|---|---|
| 8,538,980 B1 | 9/2013 | MacKenzie |
| 2013/0219456 A1 | 8/2013 | Sharma et al. |

(Continued)

FOREIGN PATENT DOCUMENTS

| | | |
|---|---|---|
| CN | 101681492 A | 3/2010 |
| CN | 102360290 | 2/2012 |

(Continued)

OTHER PUBLICATIONS

Extended European Search Report dated Jul. 20, 2022, including Supplementary European Search Report, from European Patent Application No. 19883824.5, 11 pp.

(Continued)

*Primary Examiner* — Kevin Ayala
(74) *Attorney, Agent, or Firm* — Klarquist Sparkman, LLP

(57) ABSTRACT

Mechanisms to customize forms in a distributed ledger trust network ("DLTN"). A given user can specify metadata that defines a form to be completed by other users, where the metadata that defines the form is stored in a blockchain. The given user can set permissions for the form, so as to control access to the form, and assign the form to other users for completion. After another user has submitted an instance of a form (including data entered by the other user) to the blockchain, the given user can review and approve the instance of the form, or request a correction to the form by the other user. The blockchain can store a record of the form, instances of the form that include data provided by other users at different stages, and information about the status of (Continued)

those instances of the form (e.g., approved, correction requested, rejected).

27 Claims, 15 Drawing Sheets

(51) Int. Cl.
 *H04L 9/32* (2006.01)
 *H04L 9/40* (2022.01)
 *H04L 67/02* (2022.01)
 *H04L 67/104* (2022.01)
 *H04L 67/1074* (2022.01)
 *H04L 67/1097* (2022.01)

(52) U.S. Cl.
 CPC ........ *H04L 9/3236* (2013.01); *H04L 63/0428* (2013.01); *H04L 63/062* (2013.01); *H04L 63/08* (2013.01); *H04L 63/10* (2013.01); *H04L 67/02* (2013.01); *H04L 67/104* (2013.01); *H04L 67/1076* (2013.01); *H04L 67/1097* (2013.01); *H04L 9/50* (2022.05)

(58) Field of Classification Search
 CPC ......... H04L 63/08; H04L 63/10; H04L 67/02; H04L 9/50; H04L 65/40; H04L 67/104; H04L 63/108; H04L 63/20; H04L 63/0435; H04L 63/0464; H04L 67/1097; H04L 9/3239; H04L 67/1076; G06Q 50/10
 See application file for complete search history.

(56) References Cited

U.S. PATENT DOCUMENTS

| | | | |
|---|---|---|---|
| 2013/0222835 | A1 | 8/2013 | Iwamoto et al. |
| 2014/0075280 | A1 | 3/2014 | Laakmann et al. |
| 2017/0026379 | A1 | 1/2017 | Lu et al. |
| 2017/0185622 | A1 | 6/2017 | Prahlad et al. |
| 2017/0228252 | A1 | 8/2017 | Gadelrab et al. |
| 2018/0060836 | A1 | 3/2018 | Castagna |
| 2018/0076962 | A1* | 3/2018 | Campero ............ G07C 9/00182 |
| 2018/0082043 | A1 | 3/2018 | Witchey et al. |
| 2018/0182052 | A1 | 6/2018 | Panagos |
| 2018/0218160 | A1 | 8/2018 | Wetherall et al. |
| 2018/0287800 | A1 | 10/2018 | Chapman et al. |
| 2019/0104196 | A1* | 4/2019 | Li ............................ G06F 9/547 |
| 2019/0391972 | A1* | 12/2019 | Bates ........................ G06F 16/51 |
| 2020/0005410 | A1* | 1/2020 | McKee ................ G06F 16/2255 |
| 2020/0007513 | A1* | 1/2020 | Gleichauf ............. G06F 21/105 |
| 2020/0099530 | A1* | 3/2020 | Khatib ................... G06N 20/00 |

FOREIGN PATENT DOCUMENTS

| | | | | |
|---|---|---|---|---|
| CN | 104321768 | | 1/2015 | |
| CN | 107180350 | | 9/2017 | |
| CN | 107608747 | | 1/2018 | |
| CN | 108701145 A | | 10/2018 | |
| EP | 3639463 A1 * | | 4/2020 | ......... G06F 12/0292 |
| JP | 2017-059219 | | 3/2017 | |
| KR | 10-2010-0009971 | | 1/2010 | |
| KR | 10-2013-0051979 | | 5/2013 | |
| WO | WO-2017136879 A1 * | | 8/2017 | ........... G06F 21/645 |

OTHER PUBLICATIONS

Acceptance of Complete Specification dated Aug. 22, 2022, from South African Patent Application No. 2021/03186, 1 p.
Communication pursuant to Rules 70(2) and 70a(2) EPC dated Aug. 9, 2022, from European Patent Application No. 19883824.5, 1 p.
First Examination Report dated Jan. 4, 2023, from Indian Patent Application No. 202117025742, 6 pp.
International Preliminary Report on Patentability dated May 18, 2021, from International Patent Application No. PCT/US2019/061002, 6 pp.
Office Action dated Nov. 24, 2022, from ARIPO Patent Application No. AP/P/2021/013240, 4 pp.
International Search Report and Written Opinion dated Apr. 9, 2020, from International Patent Application No. PCT/US2019/061002, 10 pp.
Acceptance Letter dated Jul. 28, 2023, from Nigerian Patent Application No. NG/PT/C/2021/5440, 3 pp.
First Office Action dated Oct. 7, 2023, from Chinese Patent Application No. 2019800887590, 13 pp.
Notification of the Substantive Examination Report dated Mar. 7, 2023, from Saudi Arabian Patent Application No. 521422017, 20 pp.
Official Action dated Sep. 14, 2023, from Indonesian Patent Application No. P00202104260, 3 pp. [No English translation].
Examination Report and Search Report dated Jul. 20, 2024, from United Arab Emirates Patent Application No. P6000773/2021, 8 pp.
Office Action dated Dec. 28, 2023, from Colombian Patent Application No. NC2021/0007712, 11 pp. [No English translation].
Office Action dated Apr. 30, 2024, from Chinese Patent Application No. 201980088759.0, 8 pp.
Office Action dated Jul. 22, 2024, from Colombian Patent Application No. NC2021/0007712, 1 p. [No English translation].
Acceptance Notice dated May 5, 2025, from Saudi Arabian Patent Application No. 521422013, 1 p. [No English translation available].
Decision to Grant dated Feb. 5, 2024, from ARIPO Patent Application No. AP/P/2021/013240, 5 pp.
Notice of Grant and Search Report dated Sep. 2, 2024, from Chinese Patent Application No. 201980088759.0, 5 pp. [No English translation].
Office Action dated Sep. 2, 2024, from Colombian Patent Application No. NC2021/0007712, 18 pp. [No English translation].
Office Action dated Jan. 10, 2025, from Mexican Patent Application No. MX/a/2021/005658, 6 pp. [No English translation].
Office Action dated Feb. 25, 2025, from Colombian Patent Application No. NC2021/0007712, 2 pp. [No English translation].
Communication pursuant to Article 94(3) EPC dated Sep. 19, 2025, from European Patent Application No. 19883824.5, 9 pp.
Substantive Examination Result dated Sep. 16, 2025, from United Arab Emirates Patent Application No. P6000773/2021, 5 pp.

* cited by examiner

FIG. 1
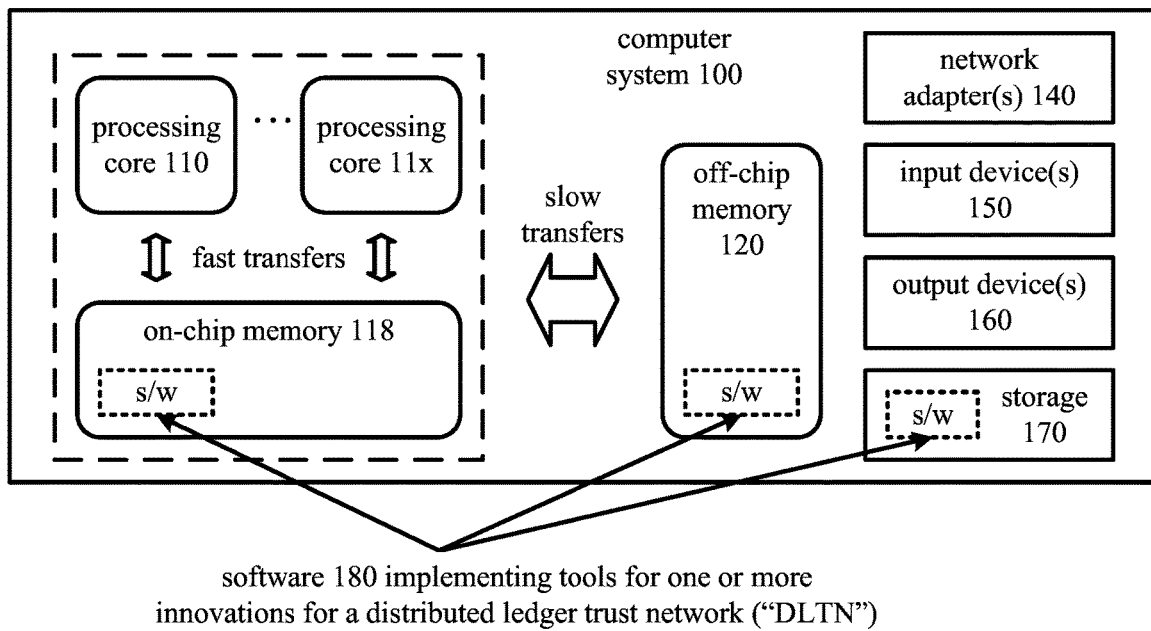
software 180 implementing tools for one or more innovations for a distributed ledger trust network ("DLTN")
FIG. 2     200
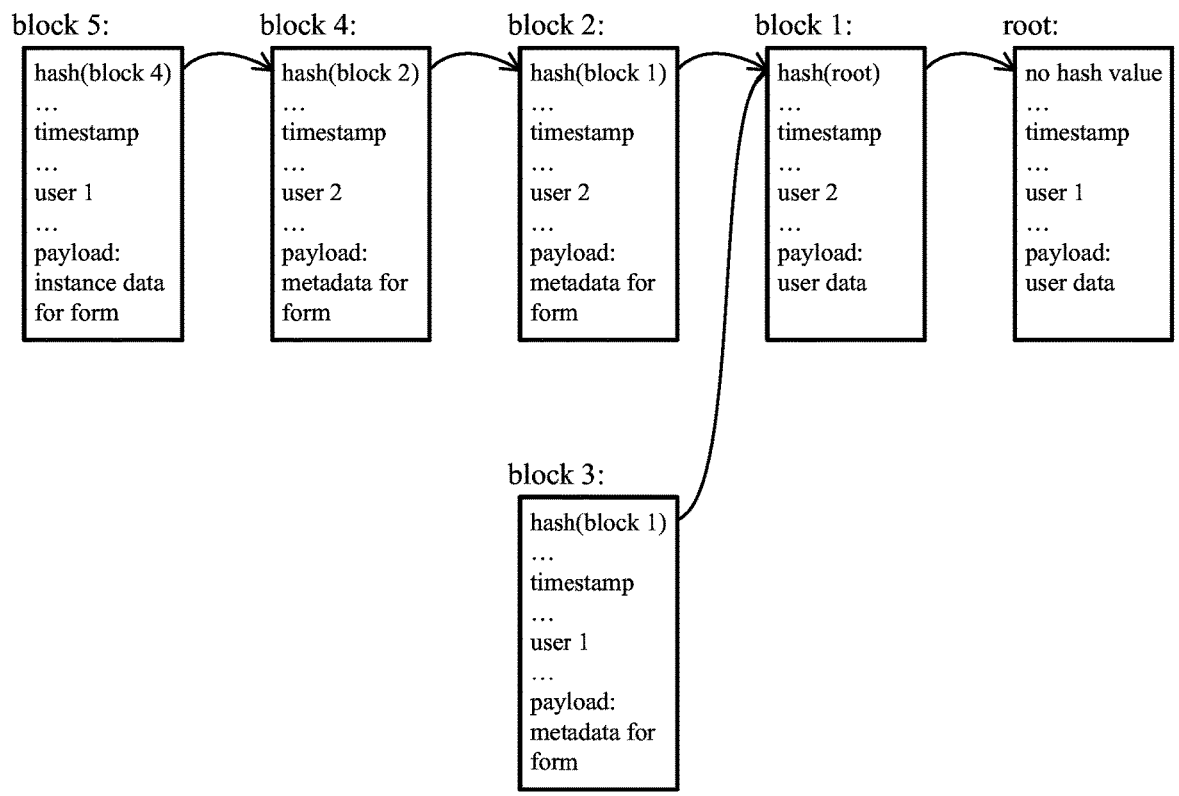

FIG. 3    300
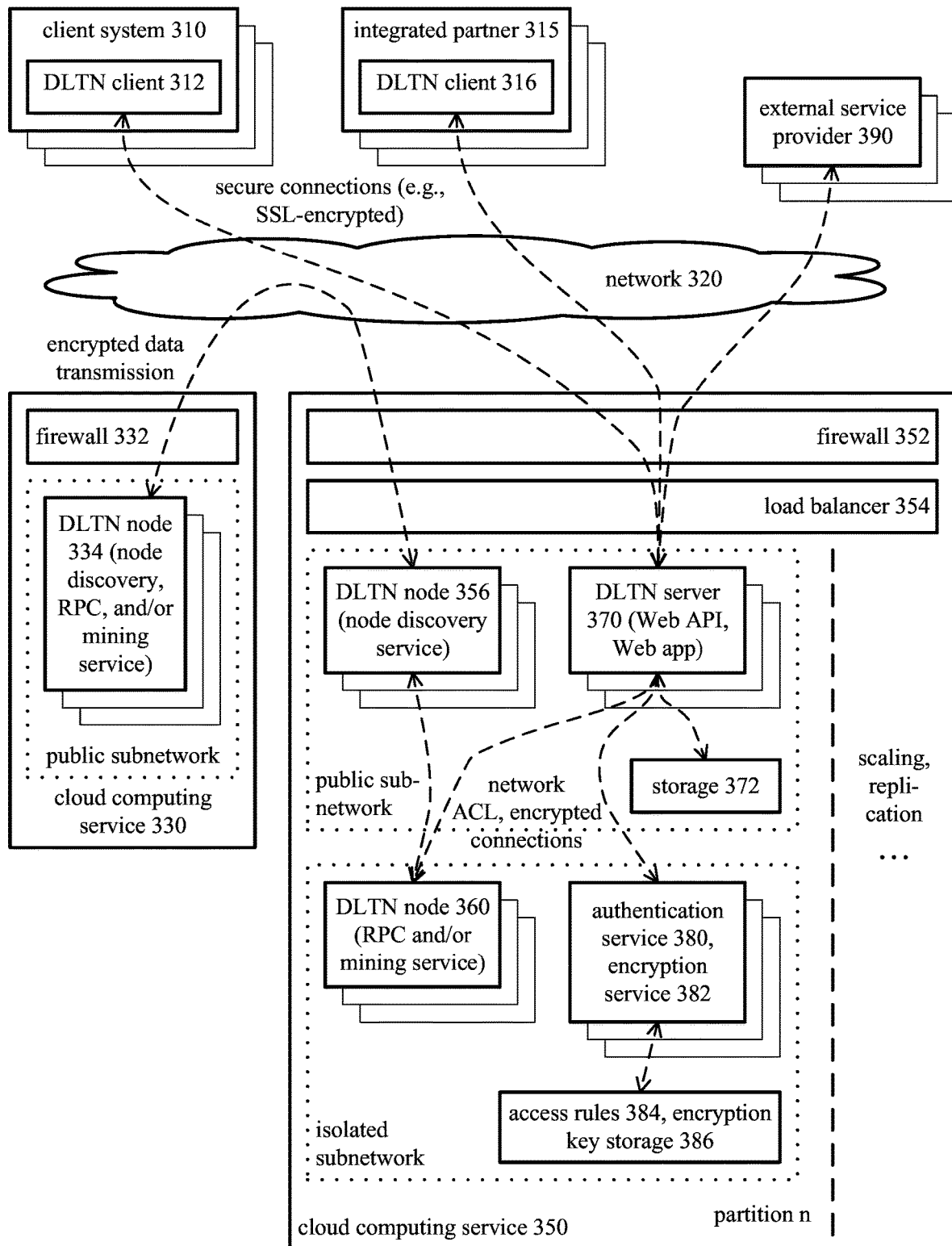

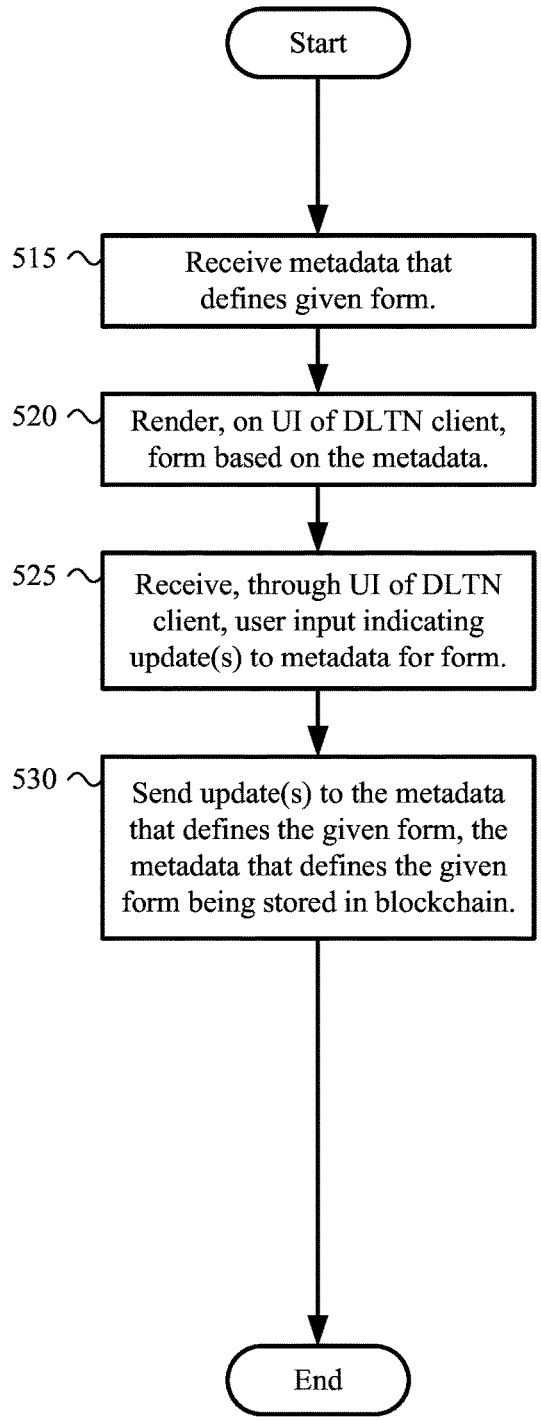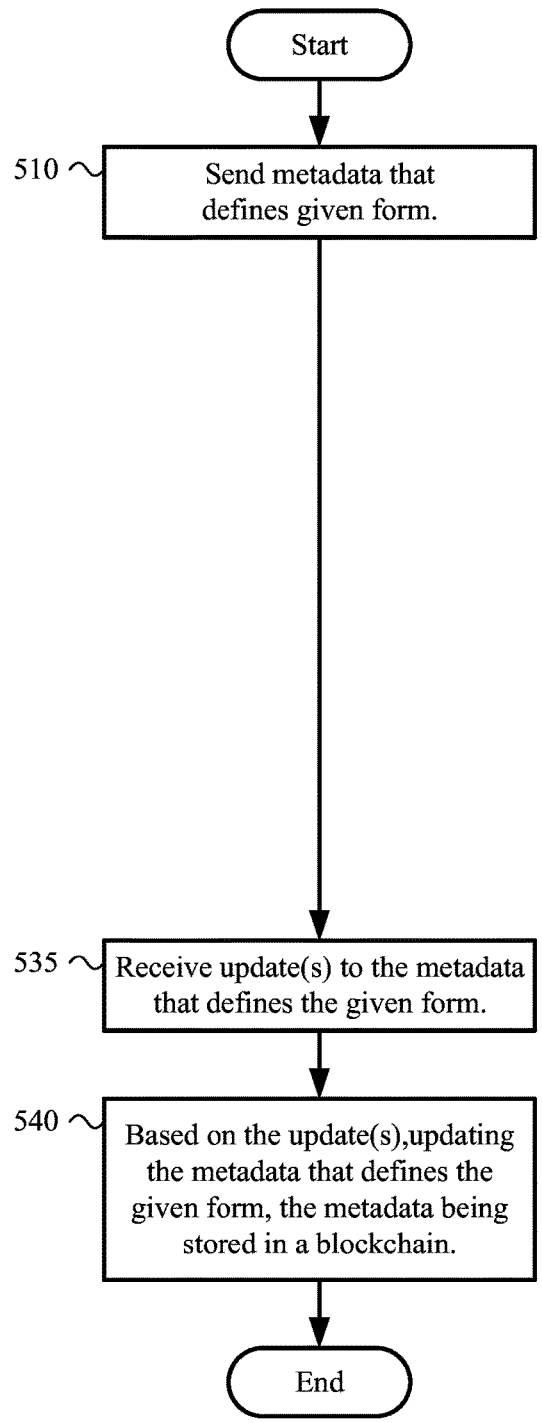

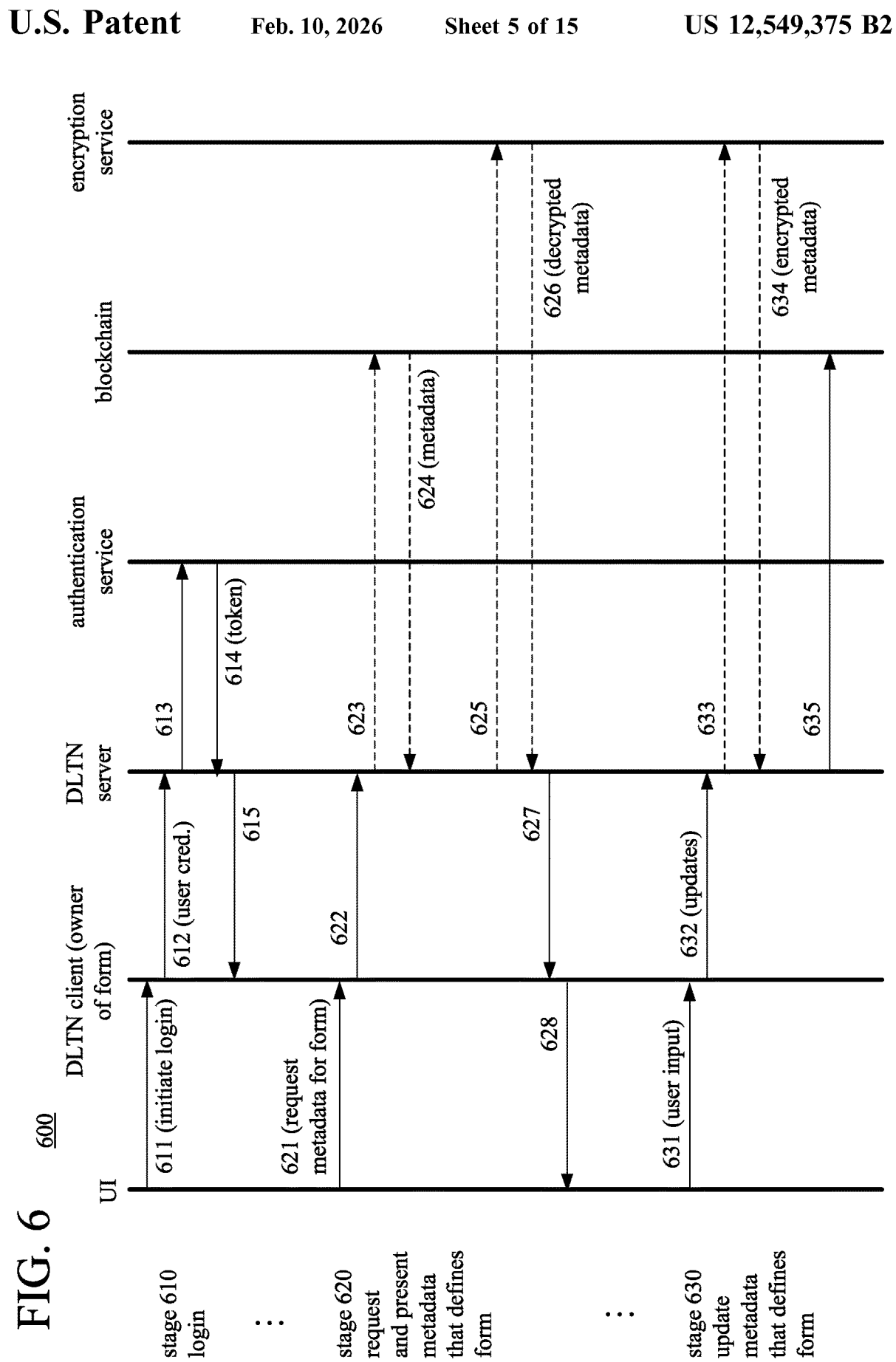

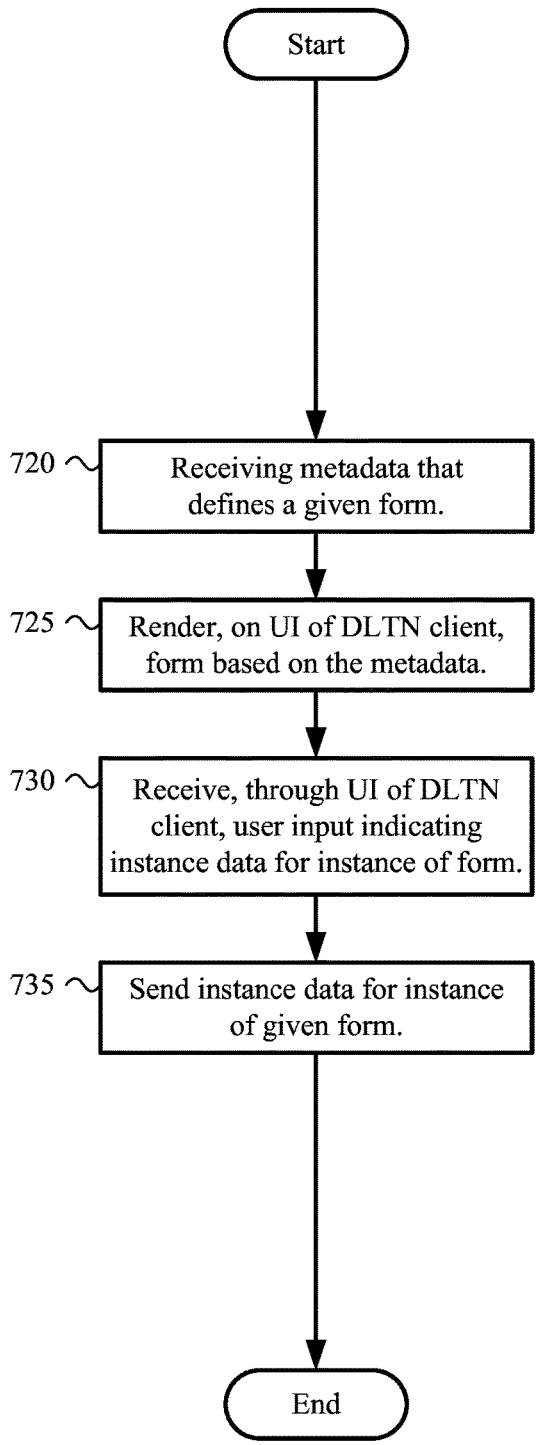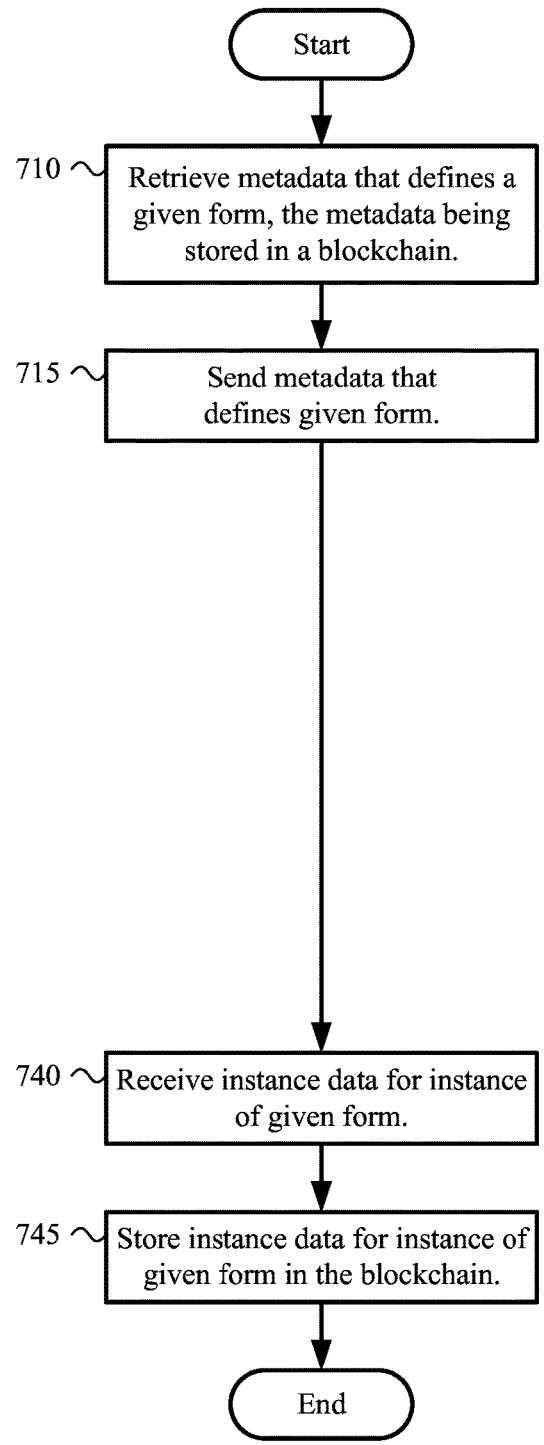

At DLTN client (user):

At DLTN server:

FIG. 11b  1110

BanQu | IDs | Apps | Forms | Assets | Requests | Admin     English

Home / Forms / Household Questionnaire Form

Household Questionnaire Form
Editor Permissions

1102

Baseline Demographics Section
Family Name [enter name for field]
Name of Head of Household [enter name for field]
List of All Members [enter name(s) for field]

New Field
Field Title    Field Placeholder
Description
JSON Field Name
Data Type       [Drop down menu for data types]
Validation    ☐ Required
Data Integrity ☐ Unique Across Submissions Permissions    Save    Cancel Add Field Add Section

| BanQu | IDs | Apps | Forms | Assets | | English |

Home / Forms / Child Questionnaire Form

Child Questionnaire Form
Form Preview

View Existing Data Entries　　or　　Create New Data Entry　　　　1122

Baseline Demographics Section
　Child Name [enter name for field]
　Mother's Name [enter name for field]
　Gender of Child [enter gender for field]
　Breadwinner in family [enter name for field]
　Village? [yes or no]

Referral Services Section
　Referral [enter name for field]

View Data Entries

Create Data Entry

Close

| BanQu | IDs | Apps | Forms | Assets | Requests | Admin | English |

Home / Forms / Data Entries
1102

Form Data Entries

All    Pending    Submitted    Reviewed    Approved

Search

Metrics Form by Farmer Juan
Created on August 9, 3:42 PM    0 % complete

Metrics Form by Farmer Two
Submitted on August 9, 3:45 PM    Approved

Metrics Form by Ashish Gadnis
Created on August 9, 3:42 PM    0 % complete

Gender Form by Farmer Juan
Submitted on July 28, 7:49 AM    Approved

Gender Form by Farmer Two
Created on July 28, 7:48 AM    0 % complete

| BanQu | IDs | Apps | Forms | Assets | Requests | Admin | English |

Home / Forms / Metrics Form / Data Entries / Farmer Two on August 9, 3:42 PM    1102

Metrics Form

Data Entries
  Gender:    female
  Land size:   67

Approved and e-signed by Coffee Company
On August 9, 3:48 PM

E-signed and submitted by Farmer Two
On August 9, 3:45 PM

Correction Requested by Coffee Company
On August 9, 3:44 PM

E-signed and submitted by Farmer Two
On August 9, 3:43 PM

1151

DEFINING AND MANAGING FORMS IN A DISTRIBUTED LEDGER TRUST NETWORK

RELATED APPLICATION INFORMATION

This application is the U.S. National Stage of International Application No. PCT/US2019/061002, filed Nov. 12, 2019, and titled "DEFINING AND MANAGING FORMS IN A DISTRIBUTED LEDGER TRUST NETWORK," which was published in English under PCT Article 21 (2), which in turn claims the benefit of U.S. Provisional Patent Application No. 62/760,789, filed on Nov. 13, 2018, and titled "ENHANCEMENTS FOR DISTRIBUTED LEDGER TRUST NETWORK,". The provisional application is incorporated herein in its entirety.

FIELD

Enhancements for a distributed ledger trust network ("DLTN"). Some of the enhancements relate to mechanisms used to define and manage forms in a DLTN using metadata that defines the forms.

BACKGROUND

Blockchain technology has been used in contexts such as banking, cryptocurrency exchange, and smart contracts. Typically, blockchain technology provides a distributed ledger that records transactions in a verifiable, permanent way. A blockchain can be distributed across a network of computer systems called nodes. The nodes follow a protocol for communication between nodes, adding new blocks to the blockchain, and approving ("validating") the new blocks.

In general, a blockchain is dynamically-growing list of records, called blocks, in a chain. A given block is logically linked to the previous block in the blockchain. For example, a hash value is computed by applying a cryptographic hash function to the data of the previous block, and the hash value is stored in the given block. The given block also includes other fields such as a timestamp and payload data (sometimes called transaction data). The payload data typically represents one or more transactions but more generally can be any kind of data. As a rule, once a given block is added to the blockchain, data in the given block cannot be later modified because any subsequent blocks depend on the data in the given block. (To retroactively alter data in the given block, the subsequent blocks in the blockchain must also be altered, requiring a level of consensus within the blockchain network that is impossible or impractical to achieve.) The integrity of the blockchain can be verified by re-computing hash values for the respective blocks in the blockchain and comparing those re-computed hash values to the previously-computed hash values that logically link the blocks.

In some cases, multiple blocks can be produced concurrently and added to the same previous block in the blockchain. This temporarily creates a fork in the blockchain. The nodes of the blockchain network follow a protocol to rank ("score") the different branches of the fork, such that one of the branches (with the highest score) is followed by all nodes. In this way, the size of non-favored branches of the blockchain is limited. Nodes supporting the blockchain share versions of the blockchain and retain the version with the highest score. Various incentives are implemented to reduce the likelihood of a version of the blockchain being superseded, the longer that version of the blockchain is used.

By storing the blockchain across nodes of the blockchain network, risks of data loss associated with storing data in a single, centralized location are mitigated. Depending on implementation, each node in a blockchain network can store a complete or partial copy of the blockchain.

In a public blockchain (also called a permissionless blockchain), blocks of the blockchain are accessible to the participants in the blockchain network, without permission. Any participant in the blockchain network can access blocks in the blockchain, verify blocks of the blockchain, add new blocks to the blockchain, and validate the new blocks of the blockchain. Access control is not used in a public blockchain. In contrast, in a private blockchain (also called a permissioned blockchain), a central authority controls access to the blockchain network. That is, the central authority controls which participants can access blocks in the blockchain, verify blocks of the blockchain, add new blocks to the blockchain, and validate the new blocks of the blockchain.

In previous approaches to implementing a blockchain, a given user is not able to customize and manage forms that can be shared with other users, which limits the functionality of the blockchain network.

SUMMARY

In summary, the detailed description presents various innovations for mechanisms used to customize forms in a distributed ledger trust network ("DLTN"). With such innovations, a given user can define and manage custom forms shared with other users in the DLTN. For example, the given user can specify metadata that defines a form to be completed by other users, where the metadata that defines the form is stored in the blockchain. The given user can set permissions for the form, so as to control access to the form by other users, and the given user can assign the form to other users for completion. In this way, in some example implementations, the process of defining and sharing custom forms in the DLTN is simplified and made available to users of the DLTN. As another example, after another user has submitted an instance of a form (including data entered by the other user) to the blockchain, the given user can review and approve the instance of the form, or request a correction to the form by the other user. In this way, in some example implementations, the process of reviewing submitted instances of the form is simplified. The blockchain can store a record of the form (as specified by metadata), instances of the form that include data provided by other users at different stages, and information about the status of those instances of the form (e.g., approved, correction requested, rejected), which provides an intuitive way to track history and usage of the form.

The innovations described herein include, but are not limited to, the innovations covered by the claims. The innovations can be implemented as part of a method, as part of a computer system configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 1 is a diagram illustrating an example computer system in which some described examples can be implemented.

FIG. 2 is a diagram illustrating an example blockchain.

FIG. 3 is a diagram illustrating an example architecture for managing a private blockchain in a DLTN.

FIGS. 5a and 5b are flowcharts illustrating aspects of a generalized technique for updating metadata that defines a form in a DLTN.

FIG. 6 is a protocol diagram illustrating an example approach to updating metadata that defines a form in a DLTN.

FIGS. 7a and 7b are flowcharts illustrating aspects of a generalized technique for providing instance data for an instance of a form in a DLTN.

FIGS. 11a-11f are diagrams of example screenshots illustrating different features of managing metadata that defines forms in a DLTN.

DETAILED DESCRIPTION

Figure 4:
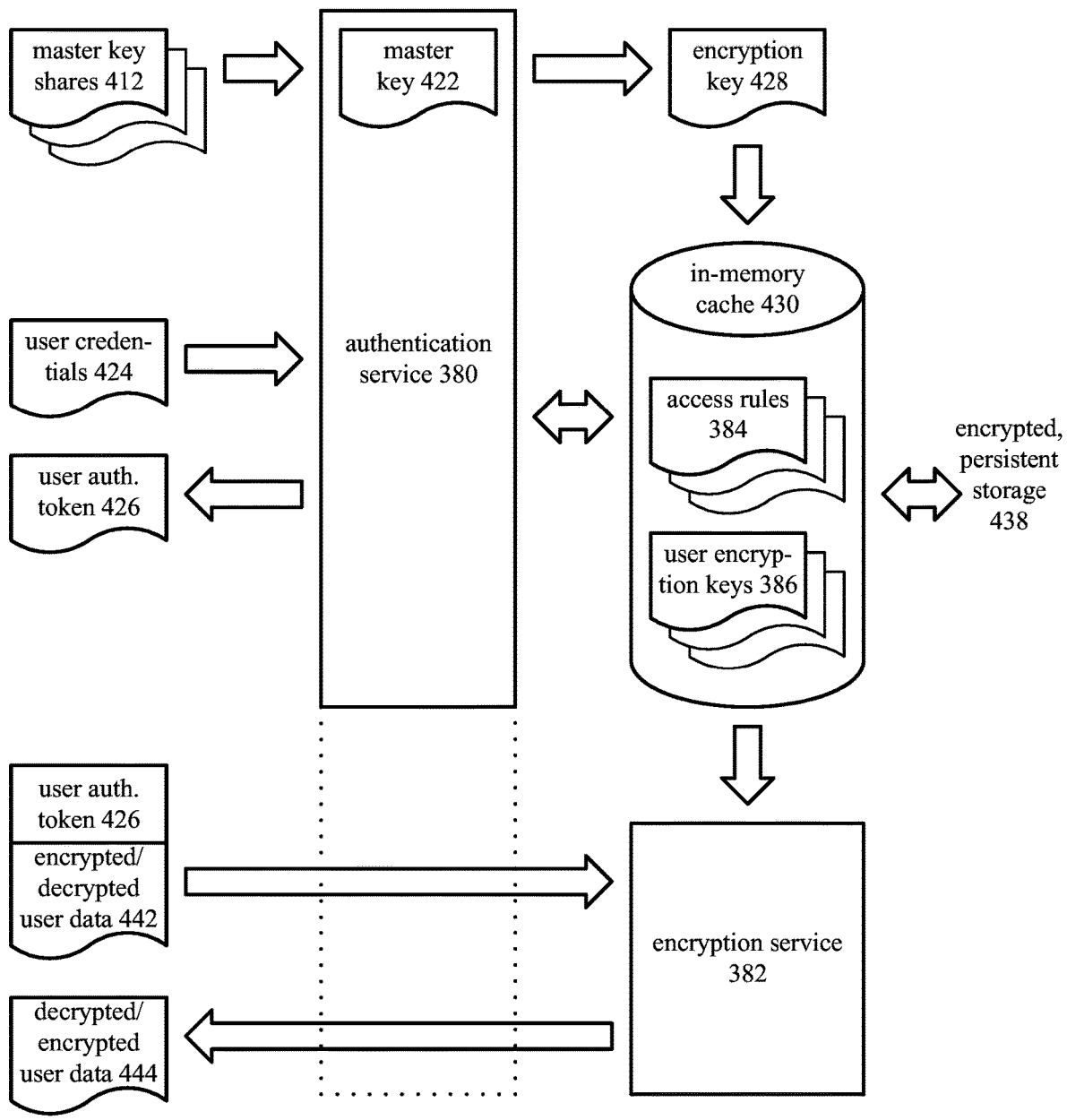
FIG. 4 is a diagram illustrating an example architecture for an authentication service and encryption/decryption service, used in the architecture of FIG. 3.

The detailed description presents various innovations for a distributed ledger trust network ("DLTN"). Some of the innovations described herein relate to mechanisms used to customize forms in a DLTN.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present invention is defined by the appended claims.

I. Example Computer Systems

FIG. 1 illustrates a generalized example of a suitable computer system (100) in which several of the described innovations may be implemented. The innovations described herein relate to enhancements for a DLTN. Aside from its use in a DLTN, the computer system (100) is not intended to suggest any limitation as to scope of use or functionality, as the innovations may be implemented in diverse computer systems, including special-purpose computer systems adapted for operations in a DLTN.

With reference to FIG. 1, the computer system (100) includes one or more processing cores (110 . . . 11x) of a central processing unit ("CPU") and local, on-chip memory (118). The processing core(s) (110 . . . 11x) execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x).

The local memory (118) can store software (180) implementing tools for innovations for a DLTN, for operations performed by the respective processing core(s) (110 . . . 11x), in the form of computer-executable instructions. In FIG. 1, the local memory (118) is on-chip memory such as one or more caches, for which access operations, transfer operations, etc. with the processing core(s) (110 . . . 11x) are fast.

The computer system (100) can include processing cores (not shown) and local memory (not shown) of a graphics processing unit ("GPU"). Alternatively, the computer system (100) includes one or more processing cores (not shown) of a system-on-a-chip ("SoC"), application-specific integrated circuit ("ASIC") or other integrated circuit, along with associated memory (not shown). The processing core(s) can execute computer-executable instructions for one or more innovations for a DLTN.

More generally, the term "processor" may refer generically to any device that can process computer-executable instructions and may include a microprocessor, microcontroller, programmable logic device, digital signal processor, and/or other computational device. A processor may be a CPU or other general-purpose unit, however, it is also known to provide a specific-purpose processor using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes shared memory (120), which may be volatile memory (e.g., RAM), non-volatile memory (e.g., ROM, EEPROM, flash memory, etc.), or some combination of the two, accessible by the processing core(s). The memory (120) stores software (180) implementing tools for one or more innovations for a DLTN, for operations performed, in the form of computer-executable instructions. In FIG. 1, the shared memory (120) is off-chip memory, for which access operations, transfer operations, etc. with the processing cores are slower.

The computer system (100) includes one or more network adapters (140). As used herein, the term network adapter indicates any network interface card ("NIC"), network interface, network interface controller, or network interface device. The network adapter(s) (140) enable communication over a network to another computing entity (e.g., server, other computer system). The network can be a wide area network, local area network, storage area network or other network. The network adapter(s) (140) can support wired connections and/or wireless connections, for a wide area network, local area network, storage area network or other network. The network adapter(s) (140) convey data (such as computer-executable instructions, audio or video input or output, or other data) in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) also includes one or more input device(s) (150). The input device(s) may be a touch input device such as a keyboard, mouse, pen, or trackball, a scanning device, or another device that provides input to the computer system (100). The computer system (100) can also include a video input, an audio input, a motion sensor/tracker input, and/or a game controller input.

The computer system (100) includes one or more output devices (160). The output device(s) (160) may be a printer, CD-writer, video output, audio output, or another device that provides output from the computer system (100).

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for a DLTN.

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, Digital Versatile Disc ("DVD"), any other optical medium, RAM, programmable read-only memory ("PROM"), erasable programmable read-only memory ("EPROM"), a USB memory stick, any other memory chip or cartridge, or any other medium from which a computer can read. The term "computer-readable memory" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Blockchains

FIG. 2 shows an example blockchain (200), which is simplified for the sake of illustration. The blockchain (200) can be replicated between different nodes of a blockchain network. Each of the nodes can store a complete or partial copy of the blockchain (200). The blockchain (200) includes multiple blocks, starting from a root block and dynamically growing as blocks are added to the blockchain. Each of the blocks includes a header and payload data.

The header for a block includes multiple fields. Except for the root block, the header includes a hash value computed by applying a cryptographic hash function to the data of the previous block in the blockchain (200). In this way, a given block is logically linked to the previous block in the blockchain. For example, the hash value for block 1 is computed by applying the cryptographic hash function to the data of the root block, the hash value for block 2 is computed by applying the cryptographic hash function to the data of block 1, and so on. The integrity of the blockchain (200) can be verified by re-computing hash values for the respective blocks in the blockchain (200) and comparing those re-computed hash values to the previously-computed hash values (in headers) that logically link the blocks. In this way, the payload data in the blockchain (200) can be verified.

The header for a block also includes a timestamp and user identifier ("ID") for the user associated with the block (e.g., the owner of the payload data). Other fields of the header depend on implementation and, for the sake of simplicity, are not shown. For example, the fields can include a key ID that identifies the encryption key used to encrypt the payload data in the block and a category ID that identifies the category of the payload data in the block. In general, the fields of the header depend on the rules defined for the DLTN.

The blockchain (200) is used as primary storage for various types of data. The blockchain (200) can be shared—there is no central database that always stores data or central administrator who owns and controls the data. The payload data (sometimes called transaction data) is arbitrary data. In some blocks of the blockchain (200), the payload data is user data for a user (e.g., for one or more transactions, contact data, biographical data, identification documents), where the user data can include static data and/or dynamic data. In some other blocks of the blockchain (200), the payload data is metadata that defines a form or instance data for the form, which can be set as explained in sections III and IV. More generally, the payload data can be any kind of data.

In the example of FIG. 2, payload data in a given block is "owned" by the user specified by the user ID in the given block. Permission settings for the user, which can be stored in the blockchain (200) or stored outside the blockchain, are used to control access to the user data of the user. The payload data in the blockchain (200) can be encrypted by encryption keys that are user-specific (for the respective owners of the payload data) and context-specific (e.g., depending on access privileges). Thus, the blockchain (200) can include different encrypted versions of the same payload data, which can be made accessible to different sets of users.

Due to successive application of the cryptographic hash function to compute the hash values that logically link blocks in the blockchain (200), a block depends on the data (including hash values) of earlier blocks in the blockchain (200). As a rule, once a block is added to the blockchain (200), data in the block cannot be later modified. To retroactively alter data in the block, subsequent blocks in the blockchain must also be altered, requiring a level of consensus within the blockchain network that may be impossible or impractical to achieve.

In some cases, multiple blocks can be produced concurrently and added to the same previous block in the blockchain (200). In FIG. 2, block 2 and block 3 were produced concurrently and added from block 1 in the blockchain (200). This temporarily creates a fork in the blockchain (200). A protocol is followed to rank ("score") the different branches of the fork, such that one of the branches (with the highest score) is followed by all nodes. In FIG. 2, block 2 has a higher score than block 3, so subsequent blocks are added from block 2. Nodes in the blockchain network share versions of the blockchain (200) and retain the version with the highest score. Various incentives are implemented to reduce the likelihood of a version of the blockchain (200) being superseded, the longer that version of the blockchain (200) is used.

In many of the examples described herein, the blockchain is a private, permissioned blockchain. In some examples, however, the blockchain can instead be a public blockchain.

For the sake of simplicity, FIG. 2 shows a blockchain (200) in which all blocks are logically linked (e.g., with hash values for the respective blocks) in a single chain. Alternatively, a set of separate chains of blocks can be used in place of a single blockchain, e.g., logically linking blocks of user data in one chain, logically linking blocks of metadata for forms in another chain. As used herein, the term "a blockchain" or "the blockchain" includes blocks logically linked into one or more chains that are managed by a blockchain platform.

III. Example Architectures

FIG. 3 shows an example architecture (300) for managing a private blockchain in a DLTN. In the example architecture (300) various entities are configured to communicate over a network (320) such as the Internet.

One or more client systems (310) each include a DLTN client (312) for the DLTN. The user of the DLTN client (312) can be an individual person, a small business, a large business, a bank, a non-profit organization, a government agency, or another entity. A client system (310) can be a personal computer, laptop computer, smartphone, or other type of computing device.

In FIG. 3, each of one or more integrated partner systems (315) also includes a DLTN client (316) for the DLTN. Compared to the user of a client system (310), the user of an integrated partner system (315) potentially has enhanced privileges, permissions, or rights in the DLTN. For purposes of the innovations described herein, however, the DLTN client (316) for an integrated partner system (315) is essentially the same as the DLTN client (312) for a client system (310). An integrated partner system (315) can be a personal computer, laptop computer, smartphone, or other type of computing device.

A DLTN client (312, 316) is configured to interoperate with a DLTN server (370) for the DLTN over a secure connection (e.g., SSL-encrypted connection). In general, the DLTN client (312, 316) provides a client-side user interface ("UI") to the DLTN. The DLTN client (312, 316) can make other client-side decisions and manage client-side communication. The DLTN client (312, 316) can be implemented as a stand-alone executable (e.g., separate application). Or, the DLTN client (312, 316) can be implemented using client-side scripting logic or other control logic in a Web browser environment, executing at the client-side. Or, the DLTN client (312, 316) can be implemented as a set of functions of a Web browser to control client-facing scripting logic executed by the DLTN server, where the scripting logic executes at the DLTN server but is controlled client-side user input for navigation (e.g., clicks, data entry). Thus, the DLTN client (312, 316) can be implemented using conventional functions of a Web browser, which provide a "front end" to a Web application of the DLTN server. In some example implementations, the DLTN client (312, 316) is implemented using conventional Web browser functions, which control a client-facing script using JavaScript Object Notation ("JSON") to interoperate with the DLTN. Acting in conjunction with the DLTN server (370), the DLTN client (312, 316) is configured to allow a user to perform various actions. For example, through the DLTN client (312, 316), the user can: log in to the DLTN; manage a network of connections to other users of the DLTN; engage in transactions with other users in the DLTN; add, edit, or remove user data; edit permission settings for the user data of the user; request access to the user data of another user; grant or revoke access to the user data of the user in response to a request from another user; create a custom form to be shared with other users; provide data for a form shared by another user; or review, approve, reject or take some other action on a submitted form. In particular, the functionality of a DLTN client (312, 316) in various scenarios is described in section IV.

One or more external service providers (390) are configured to provide services to a DLTN server (370). An external service provider (390) is configured to interoperate with the DLTN server (370) over a secure connection (e.g., SSL-encrypted connection).

For example, the external service providers (390) can include one or more providers of communication services, which are configured to provide programmatic access to a DLTN server (370) for functionality to make and receive phone calls, send and receive text messages via SMS or another set of protocols, or perform other communication functions. In some example implementations, the external service providers (390) include Twilio, Clickatell, and Nexmo. In particular, the provider of communication services can allow the DLTN server (370) to communicate with a user via an alternative channel of communication (e.g., phone call and voice navigation menu; SMS messages).

As another example, the external service providers (390) can include one or more providers of email services, which are configured provide programmatic access to a DLTN server (370) for functionality to send and receive emails. In some example implementations, the external service providers (390) include SendGrid. In particular, a provider of email services can allow the DLTN server (370) to communicate with a user via an alternative channel of communication (e.g., email).

In FIG. 3, cloud computing services (330, 350) host services that provide functionality for the DLTN. For example, the cloud computing services (330, 350) are provided through Microsoft Azure, Google Cloud, or Amazon Web Services. Although FIG. 3 shows two different providers (330, 350) for cloud computing services, alternatively, a single provider or more providers could be used to host services that provide functionality for the DLTN. Or, privately owned computing resources or a mix of privately owned computing resources and cloud computing services could be used to provide server-side functionality for the DLTN.

A cloud computing service (330, 350) can be configured to organize services into separate partitions, groups, etc. In this way, the cloud computing service (330, 350) can support scaling of the services and/or replication. A load balancer (354) can be configured to distribute traffic and workloads across partitions.

A firewall (332, 352) can be configured to monitor and control incoming network traffic and outgoing network traffic. The firewall (332, 352) can be configured to apply various security rules to establish a barrier between the network (320) and resources of the cloud computing service (330, 350). A cloud computing service (330, 350) can be configured to include one or more public subnetworks and one or more isolated (private) subnetworks. In general, a public subnetwork is accessible to the Internet. An isolated network is not accessible through the Internet, but instead is accessible through an access control list ("ACL") or other mechanisms managed by the cloud computing service (330, 350).

In some example implementations, services hosted in the cloud computing service (330, 350) are deployed in "containers" or executed in virtual machines. A container or virtual machine virtualizes access to resources, which are provided by the cloud computing service (330, 350). In some example implementations, services are deployed in Docker containers, which can be distributed across different locations.

The DLTN includes various specialized nodes, which are configured to perform different services according to the rules of the DLTN. For redundancy, the nodes can be distributed across one or more clouds provided through the cloud computing services (330, 350). For example, the DLTN uses Ethereum technology, which provides a blockchain-based distributed computing platform and operating system, potentially supporting smart contract functionality. Alternatively, the DLTN uses another technology (e.g., Eris:db, HydraChain, Hyperledger Fabric, Iroha, Sawtooth Lake, IBM Blockchain Platform, Multichain, Openchain, Cardano, Quorum, Stellar, Symbiont Assembly, BigChainDB, ChainCore, Corda, Credits, Domus Tower Blockchain, Elements Blockchain Platform). As used herein, the terms "distributed ledger trust network" and "blockchain network" are interchangeable, and the term blockchain generally indicates any ledger of records (blocks) that are logically linked.

Nodes (334, 356, 360) of the DLTN provide various services. In general, a DLTN node can be configured to store (synchronize) data for the blockchain. Or, a DLTN node can be configured to validate transactions, before a new block is added to the blockchain. (In some example implementations, a block can be added to the blockchain without use of a cryptocurrency for payment. As such, the speed and security of transactions is not impacted by potential volatility of a cryptocurrency used in the DLTN. Alternatively, a cryptocurrency (e.g., Ether) can be used for payments within the DLTN. In such implementations, a DLTN node can be configured to mine for cryptocurrency used in the DLTN.) Or, a DLTN node can coordinate activity in the DLTN. In general, to add a block to the blockchain, a DLTN node approves (validates) the block and adds the block.

In FIG. 3, a DLTN node (356) hosted in a public subnetwork of the cloud computing service (350) provides a node discovery service. A node discovery service is used to locate nodes in the DLTN. In some example implementations, the DLTN node (356) is an Ethereum bootnode, which provides a lightweight service to locate nodes according to a node discovery protocol. As another example, a DLTN node (360) hosted in an isolated subnetwork of the cloud computing service (350) provides an RPC service and/or mining service. In some example implementations, the node (360) provides an Ethereum RPC service and/or Ether mining service. As another example, a DLTN node (334) hosted in a public subnetwork of the cloud computing service (330) provides a node discovery service, RPC service, and/or mining service. The DLTN nodes (334, 356) in the public subnetworks communicate via encrypted data transmission over the network (320). The DLTN node (360) in the isolated subnetwork communicates with the node (356) in the public subnetwork via a connection secured using network ACLs and encryption.

In some example implementations, the DLTN nodes (334, 356, 360) are Ethereum nodes implemented using Geth. Alternatively, the nodes use another implementation of Ethereum or use another DLTN technology. In some example implementations, the DLTN nodes (334, 356, 360) are deployed in Docker containers. Alternatively, the DLTN nodes (334, 356, 360) are deployed using another virtualization technology.

The architecture (300) includes one or more DLTN servers (370). A DLTN server (370) is configured to interoperate with one or more DLTN clients (312, 316) for the DLTN over a secure connection (e.g., SSL-encrypted connection). The DLTN server (370) is also configured to interoperate with one or more external service providers (390) over secure connections (e.g., SSL-encrypted connections). The DLTN server (370) can be implemented as a stand-alone executable, as a Web application (also called Web-based application), or in some other way. In some example implementations, the DLTN server (370) includes control logic executable to implement methods of an application programming interface ("API"), to provide Web application functionality, to make other server-side decisions, and to manage server-side communication. In these example implementations, the API is designed according to representational state transfer ("REST") principles. The API is designed to have predictable, resource-oriented uniform resource locators ("URLs") and to use HTTP response codes to indicate API errors. The API uses built-in HTTP features (such as HTTP verbs), which are typically understood by off-the-shelf HTTP clients. The API uses JSON for input and output. Web application components of the DLTN server (370) can be separate from API components of the DLTN server (370). For example, with respect to front-end components for interoperating with a DLTN client (312, 316), the DLTN server (370) can be implemented using a library (such as React, a JavaScript library) that provides functionality for building UIs, as well as a library (such as Redux, a JavaScript library) that provides functionality for managing application state. With respect to back-end components, the DLTN server (370) can be implemented using a run-time environment (such as NodeJS) for server-side scripting and command line tools, as well as a Web application framework (such as Express) that provides functionality for building Web applications and APIs. Alternatively, the DLTN server (370) can be implemented in some other way. In some example implementations, the DLTN server (370) is deployed in a Docker container in the cloud computing environment. Alternatively, the DLTN server (370) is deployed using another virtualization technology.

In some respects, the one or more DLTN servers (370) in the architecture (300) act as a centralized authority by mediating access to the blockchain network and other platform functions (e.g., for authentication or encryption/decryption). For example, a DLTN server (370) controls write access to the blockchain and limits read access to the blockchain using a permissioning mechanism. In other respects, however, the DLTN server (370) does not act as a central authority. There can be multiple DLTN servers (370). Moreover, transactions between users of the DLTN do not require approval or mediation by a DLTN server (370), aside from mediation of access to the blockchain network or other platform functions.

A DLTN server (370) is configured to allow a user, through a DLTN client (312, 316), to perform various actions, as described above. In particular, the functionality of a DLTN server (370) in various scenarios is described in section IV.

The DLTN client (312, 316) and DLTN server (370) can be internationalized/localized to different languages.

The architecture (300) also includes storage (372), which is configured to store photos, attachments, and other data accessible to the DLTN server (370). Such data can be used in various operations for the DLTN. The DLTN server (370) is configured to connect to the storage (372) over a connection that is secured using network ACLs and encryption.

The authentication service (380) provides authentication services to the DLTN server (370). The encryption service (382) provides encryption/decryption services to the DLTN server (370). The DLTN server (370) connects to the authentication service (380) and the encryption service (382) over connections that are secured using network ACLs and encryption. In some example implementations, the authentication service (380) and encryption service (382) are implemented using Vault. Alternatively, the authentication service (380) and encryption service (382) can be implemented in some other way. In some example implementations, the authentication service (380) and encryption service (382) are deployed in a Docker container in the cloud computing environment. Alternatively, the authentication service (380) and encryption service (382) are deployed using another virtualization technology.

The authentication service (380) and encryption service (382) are configured to manage and apply access rules (384) (such as ACL data, policy data) and encryption keys (386) in storage, which is accessible to the authentication service (380) and encryption service (382) over a secure connection. The access rules (384) (e.g., ACL data, policy data) and encryption keys (386) are stored in encrypted form in a protected (isolated) subnetwork with no Internet access. In the DLTN, data is typically encrypted at rest and in transit. In general, data in the blockchain is encrypted with encryption keys that are user-specific and context-specific. In transit, data can be encrypted using a mechanism provided by the connection. In some example implementations, key storage is implemented using Consul. Alternatively, key storage can be implemented in some other way.

Operations and features of the authentication service (380) and encryption service (382) are further explained with reference to the architecture (400) of FIG. 4.

The authentication service (380) performs various operations to initialize structures and data used for authentication. For example, the authentication service (380) can use a set of master key shares (412), after a threshold number of master key shares (412) is acquired, to create a master key (422). The authentication service (380) can use the master key (422) to determine an encryption key (428) that is usable to decrypt access rules (384) and user encryption keys (386). The authentication service (380) can retrieve encrypted versions of the access rules (384) and user encryption keys (386) from persistent storage (438) and perform decryption operations using the encryption key (428). The decrypted access rules (384) and user encryption keys (386) are buffered in an in-memory cache (430) accessible to the authentication service (380).

When a user enrolls, the authentication service (380) can randomly generate a set of encryption keys for a user. The authentication service (380) can use key derivation and rotation to separate encryption contexts. If needed, the authentication service (380) can generate additional encryption keys for the user (e.g., for different subsets of users with whom user data is shared, or for other different contexts). The encryption keys for a user can be organized in different ways, depending on implementation. For example, the encryption keys for a user can include a first set of one or more encryption keys used to encrypt/decrypt data that is not shared (i.e., private), a second set of one or more encryption keys used to encrypt/decrypt data that is shared with the connections of the user in the DLTN, and a third set of one or more encryption keys used to encrypt/decrypt data that is shared with everybody in the DLTN (i.e., public). In this configuration, according to access rules (ACLs, policy data, etc.) and consistent with permission settings, the first encryption key(s) are not shared with other users, the second encryption key(s) are shared with connections of the user in the DLTN, and the third encryption key(s) are shared with all users in the DLTN. (An encryption key that is "shared" with another user can be accessed and used by the encryption service (382) on behalf of the other user, but is not actually distributed to the other user.) Or, as another example, the encryption keys for a user can include one or more encryption keys for each different subset of users in the DLTN (e.g., first encryption key(s) shared with no users, second encryption key(s) shared with a first subset of users, third encryption key(s) shared with a second subset of users, . . . , $n^{th}$ encryption key(s) shared with all users). Alternatively, the encryption keys for a user can be organized in some other way.

In general, access to sensitive data is restricted to rely on authentication, authorization and accountability provided using the authentication service (380) and encryption service (382). Before a user receives access to encryption keys, encryption/decryption requests are checked according to security policies and logged. In operation, the authentication service (380) uses ACLs and policies to regulate access by a user to the encryption keys the user owns as well as shared encryption keys. In some example implementations, the authentication service (380) operates in a "whitelist" mode. An action is not allowed unless explicitly granted via policy. The authentication service (380) receives user credentials (424) for a user from the DLTN server (370) and authenticates the user according to the access rules (e.g., ACL data, policy data). If the user is authenticated and access is granted, the authentication service (380) returns a user authentication token (426) for the user. The user authentication token (426) is associated with a list of access policies and corresponding encryption keys that can be used according to the access policies, which are also provided to the encryption service (382).

For encryption/decryption, the DLTN server (370) passes user data (442) and a user authentication token (426) to the encryption service (382). The encryption service (382) returns user data (444). For a decryption operation, the user data (442) passed to the encryption service (382) is encrypted, and the user data (444) returned by the encryption service has been decrypted using the appropriate encryption key. For an encryption operation, the user data (442) passed to the encryption service (382) is decrypted, and the user data (444) returned by the encryption service has been encrypted using the appropriate encryption key. The "user data" that is encrypted/decrypted by the encryption service (382) can be metadata that defines a form, instance data for a form, or feedback for a form, as described in section IV. In some example implementations, the encryption service (382) uses symmetric key encryption—the same encryption key is used for encryption and decryption of data. Alternatively, the encryption service can use asymmetric key encryption (e.g., according to a public/private key protocol).

IV. Example Metadata that Defines Forms and Related Operations

This section describes various aspects of management of custom forms using metadata stored in a blockchain of a DLTN. In some example implementations, the innovations enable a user to create custom forms and manage workflows that use the custom forms in the DLTN. The innovations described in this section can be used to enable various features, including, but not limited to:
- the ability for a user (form creator) to define, through a UI of a DLTN client, a custom form using metadata, which is stored in the blockchain;
- the ability for a user (form creator) to set permissions to share a custom form with all other users or selected other users in the DLTN;
- the ability for a user (form creator) to assign a custom form to other users in the DLTN;
- the ability for a user (form creator) to create and manage an approval workflow for a custom form;
- the ability for a user (form submitter) to provide data for a custom form and submit an instance of the custom form, which is stored in the blockchain;
- the ability for a user (form reviewer) to review an instance of a custom form stored in the blockchain, and approve the instance of the form or otherwise provide feedback on the instance of the form; and
- the ability for a user to create and access an immutable record of a custom form, submitted instances of the custom form, and status of the submitted instances at various stages.

A. INTRODUCTION

In addition to storing user data, a blockchain can store metadata that defines custom forms. A DLTN server in a DLTN can provide a UI through a DLTN client, allowing a user to define a custom form. When the custom form is saved, metadata that defines the custom form can be stored in a new block of the blockchain, in association with the user ID of the user who created the custom form.

When creating a custom form, a user can start from a previous custom form, from a preset template for a form, or from an empty form. The user can add one or more fields to the custom form. A custom form can include an arbitrary number of data fields, each having defined attributes. For example, the user can specify information such as a name, type of control (e.g., text, radio button, slider), or other attribute for a field of the custom form. A custom form can include a single section or multiple sections. A custom form can also include embedded rules to check consistency of data and adapt which fields are active, depending on previously entered data. This provides extensibility at the data layer and form layer.

The user can set permissions for a custom form, so as to control which users can access the custom form in the DLTN. For example, a custom form can be made available to all connections of a user in the DLTN, to selected users in the DLTN, or to all users in the DLTN. This provides extensibility at the access level, for secure and permissioned management of custom forms in the DLTN. Permission settings for custom forms can be managed using any of various mechanisms.

For a user to provide data for a custom form, a DLTN client can present the custom form. For example, the DLTN client renders the custom form in its UI and accepts user input into fields of the custom form. When the user finishes entering data into the custom form, the user can sign the custom form with an electronic signature. The user submits the custom form by saving an instance of the custom form in a new block of the blockchain, in association with the user ID of the user who submitted the custom form. The new block can include the metadata that defines the form as well as data provided by the user. The user submitting the instance of the custom form can specify permissions, so that the user and a form reviewer can access the submitted instance of the custom form. Thus, when a user enters data for an instance of a custom form, the user can set permissions for the instance of the custom form, so as to control which users can access and review the instance of the custom form. Permission settings for instance data can be managed using any of various mechanisms.

A reviewer can review the submitted instance of the custom form. For example, a DLTN client renders the submitted instance of the custom form in its UI and accepts feedback from the reviewer. The reviewer can check the electronic signature, approve the instance of the form, request corrections to the instance of the form, or provide other feedback. A new (reviewed) instance of the custom form can be saved in a new block of the blockchain, in association with the user ID of the user who reviewed the custom form. The new block can include the metadata that defines the form as well as data provided by the submitter and feedback from the reviewer. The reviewer can specify permissions, so that the original form submitter (submitter of instance data) and the reviewer can access the new instance of the custom form. Permission settings for feedback (or a new instance) from the reviewer can be managed using any of various mechanisms. If requested, the submitter can make changes to the previously-submitted instance or reviewed instance of the custom form and save another instance of the custom form in the blockchain.

In general, each new event of the submission and review process can result in saving of a new block in the blockchain. Collectively, the blocks provide a record of the history of the submitted instances of a custom form by a user. For example, the blockchain includes a block for initial completion of an instance of the custom form by a user, another block for a correction request, and a third block for a changed/corrected instance of the custom form. Upon approval, the blockchain includes a block for the approved instance of the custom form.

B. Examples of Operations Involving Metadata that Defines Forms

FIGS. 5a, 5b, 7a, 7b, 9a, and 9b illustrate different operations involving metadata that defines forms. Some of the operations are performed by a DLTN client, while other operations are performed by a DLTN server. In general, the DLTN client is configured to perform various operations to interoperate with the DLTN server to access a DLTN, and the DLTN server is configured to perform various operations to provide access to the DLTN. In some example implementations, the DLTN uses Ethereum technology. Alternatively, the DLTN uses another DLTN technology.

In these examples, the metadata that defines a form is (or will be) stored in a blockchain of the DLTN in association with identity of the user who owns the form. In some example implementations, the blockchain is a private blockchain, with the DLTN server managing access to the private blockchain. Alternatively, the blockchain is a public blockchain. The blockchain includes one or more blocks. For example, a given block among the block(s) of the blockchain includes a hash value based on one or more previous blocks in the blockchain, a key identifier, a type value, a user ID of a given user, and metadata that defines a form owned by the given user. The metadata is encrypted, e.g., using one of a set of encryption keys that are user-specific and context-specific. Alternatively, a given block of the blockchain includes other and/or additional fields. Access to the metadata that defines the form can be managed using permission settings.

In some example implementations, the DLTN client is a DLTN client (312, 316) as described with reference to FIG. 3, and the DLTN server is a DLTN server (370) as described with reference to FIG. 3. The DLTN server can include a Web application and implement an API accessible to the DLTN client. The DLTN client can be implemented as a set of functions of a Web browser to control client-facing scripting logic executed by the DLTN server. The DLTN server executes in a public sub-network of a cloud computing service. The DLTN server is configured to call an authentication service and an encryption service that execute in an isolated sub-network of the cloud computing service. For operations that involve the blockchain of the DLTN, the DLTN server is configured to call one or more nodes of the DLTN that execute in an isolated sub-network of the cloud computing service. Alternatively, the DLTN client and/or DLTN server are implemented in some other way, for example, as described above with reference to FIG. 3.

C. Examples of Defining Metadata for Custom Forms

FIG. 5a shows a generalized technique (501) for updating metadata that defines a form in a DLTN, from the perspective of a DLTN client of a given user. FIG. 5b shows a generalized technique (502) for updating metadata that defines a form in a DLTN, from the perspective of a DLTN server. The updating activity shown in FIGS. 5a and 5b can happen when a previously created form is revised. In this case, the metadata that defines the form includes previously specified values, which are modified according to one or more updates to the form. An update can include, for example, the addition or change of a title of the form; the addition, removal, or change of a section of the form; the addition, removal, or change of a field of the form; the addition, removal, or change of an attribute of a field; the addition, removal, or change of a permission setting for the form; and/or some other addition, removal, or change. Or, the updating activity shown in FIGS. 5a and 5b can happen when a form is created. In this case, the metadata that defines the form includes default, initial values, which may be modified according to one or more updates to the form. An update can include, for example, the addition of a title of the form; the addition of a section of the form; the addition of a field of the form; the addition of an attribute of a field; the addition of a permission setting for the form; and/or some other addition or change.

With reference to FIG. 5b, the DLTN server sends (510), to the DLTN client, metadata that defines a given form. With reference to FIG. 5a, the DLTN client receives (515), from the DLTN server, the metadata that defines the given form. The metadata that defines the given form can be sent/received in encrypted form over a secure connection. The metadata can define various properties of the given form, such as a title of the given form, one or more sections of the given form, and one or more fields of the given form. For a given field, the metadata can define one or more attributes of the field, such as a type of the field (e.g., short text, multi-line text, drop-down menu, select list, checkbox, slider, a date/time selector, a formula, or an attachment), a title of the field, a default value for the field, a description of the field, an indication of whether validation is required for the field, an indication of whether a value of the field is required to be unique, and/or another attribute. The metadata can also include one or more permission settings for the given form, which can allow the form to be shared with all connections of a user, or with some subset of the connections of the user, or not be shared at all (private).

The DLTN client renders (520), on the UI of the DLTN client, the given form based on the metadata. The DLTN client can include a form rendering engine (e.g., as part of a Web browser) operable to parse the metadata that defines the given form and perform the rendering of the form. In addition to displaying information about the form (e.g., title, section(s), field(s), attribute(s) of field(s), permission settings), the DLTN client presents, through the UI of the DLTN client, graphical elements that are operable to edit the form. The graphical elements can include text boxes, drop-down menus, select lists, checkboxes, slider controls, and/or other controls to edit properties of the given form and attributes of fields.

The DLTN client receives (525), through the UI of the DLTN client, user input from a user indicating one or more updates to the metadata that defines the given form. For example, an update can include the addition or change of a title of the form; the addition, removal, or change of a section of the form; the addition, removal, or change of a field of the form; the addition, removal, or change of an attribute of a field; the addition, removal, or change of a permission setting for the form; and/or some other modification to the form. The DLTN client sends (530), to the DLTN server, the update(s) to the metadata that defines the given form. The update(s) can be sent/received in encrypted form over a secure connection.

With reference to FIG. 5b, the DLTN server receives (535), from the DLTN client, the update(s) to the metadata that defines the given form. Based on the update(s) to the metadata that defines the form, the DLTN server updates the metadata that defines the form. The metadata that defines the form is stored in a blockchain of the DLTN (e.g., in association with identity of the user who owns the form). For example, the DLTN server adds the updated metadata for the form in a new block of the blockchain.

The DLTN server can manage multiple forms owned by a user. In this case, the DLTN server can retrieve a list of forms owned by the user along with information about the forms, respectively, and then send, to the DLTN client, the list of forms and information about the forms, respectively. Such information can be sent/received over a secure connection. For a given form, the information about the form can include a title of the form, a count of sections in the form, a count of fields in the form, a permission status of the form, a count of instances of the form created by users, a count of instances of the form requested from users, a count of instances of the form submitted by users, and/or other information.

After receiving the list of forms and information about the forms from the DLTN server, the DLTN client can render, on the UI of the DLTN client, the list of forms, the information about the forms, respectively, and graphical controls for one or more actions for the forms, respectively. For example, the graphical controls for a given form include a graphical control for an action to view instance data for instances of the given form, a graphical control for an action to assign the given form, a graphical control for an action to edit the given form, and/or a graphical control for an action to archive the given form. The DLTN client can receive, through the UI of the DLTN client, user input from the user indicating selection of a given form for editing. The DLTN client can then send, to the DLTN server, an indication of the selection. The DLTN server can receive, from the DLTN client, an indication of selection of the form for editing. In response, the DLTN server sends the metadata that defines the form to the DLTN client for editing as described with reference to FIGS. 5a and 5b. Alternatively, the user can assign the given form to another user in the DLTN for data entry. In this case, for the other user, the given form will appear in a list of forms to be completed by the other user.

FIG. 6 shows an example approach (600) to updating metadata that defines a form in a DLTN. The approach includes some of the operations described with reference to FIGS. 5a and 5b as well as operations for user login, decryption, and encryption. In the example approach (600) shown in FIG. 6, communication between the DLTN client and DLTN server can use encrypted messages over a secure connection for a session (e.g., SSL connection). Metadata for the form can be stored in encrypted form using separate encryption keys, which are specific to the given user (owner of the form) and managed by an encryption service.

To start, in a login stage (610), a user, who is the owner of a form, initiates (611) a login process through the UI of a DLTN client. The DLTN client provides (612) credentials of the user to the DLTN server. The DLTN server authenticates (613, 614) the user with an authentication service, which provides a user authentication token to the DLTN server when authentication succeeds. The DLTN server sends (615) a message to the DLTN client, indicating that authentication has succeeded.

In the next stage (620), information about a given form is requested and presented to the user. Through the UI of the DLTN client, the user requests (621) metadata for a given form. The DLTN client sends (622) the request to the DLTN server, which retrieves (623, 624) the metadata for the given form from the blockchain. The metadata can be retrieved in encrypted form, in which case the DLTN server calls (625) an encryption service to decrypt the metadata. To decrypt the metadata, the encryption service uses one or more appropriate user-specific encryption keys for the user (owner of the form). The encryption service returns (626) the metadata in decrypted form to the DLTN server, which sends (627) the decrypted metadata to the DLTN client. The DLTN client parses the metadata and presents (628) the given form through the UI of the DLTN client.

In the next stage (630), the user provides (631), through the UI of the DLTN client, user input that indicates one or more updates to the given form. The DLTN client sends (632) the updates to the DLTN server, which updates the metadata. If the updated metadata is stored in encrypted form, the DLTN server calls (633) the encryption service to encrypt the updated metadata, and the encryption service returns (634) the updated metadata in encrypted form. To encrypt the metadata, the encryption service uses one or more appropriate user-specific encryption keys for the user (owner of the form). The DLTN server stores (635) the updated metadata in the blockchain (e.g., in a new block of the blockchain).

D. Examples of Submitting Instance Data for Forms

FIG. 7a shows a generalized technique (701) for providing instance data for a form, from the perspective of a DLTN client of a given user. FIG. 7b shows a generalized technique (702) for providing instance data for a form, from the perspective of a DLTN server.

With reference to FIG. 7b, a DLTN server retrieves (710) metadata that defines a given form. The metadata that defines the given form is stored in a blockchain of the DLTN (e.g., in association with identity of an owner of the given form). The DLTN server sends (715), to a DLTN client, the metadata that defines the given form. With reference to FIG. 7a, the DLTN client receives (720), from the DLTN server, the metadata that defines the given form. The metadata that defines the given form can be sent/received in encrypted form over a secure connection. The metadata can define various properties of the given form, such as a title of the given form, one or more sections of the given form, and one or more fields of the given form. For a given field, the metadata can define one or more attributes of the field, such as a type of the field (e.g., short text, multi-line text, drop-down menu, select list, checkbox, slider, a date/time selector, a formula, or an attachment), a title of the field, a default value for the field, a description of the field, an indication of whether validation is required for the field, an indication of whether a value of the field is required to be unique, and/or another attribute.

The DLTN client renders (725), on the UI of the DLTN client, the given form based on the metadata. The DLTN client can include a form rendering engine (e.g., as part of a Web browser) operable to parse the metadata that defines the given form and perform the rendering of the form. In addition to displaying information about the form (e.g., title, section(s), field(s), attribute(s) of field(s)), the DLTN client presents, through the UI of the DLTN client, graphical elements that are operable to complete fields of the form. The graphical elements can include text boxes, drop-down menus, select lists, checkboxes, slider controls, and/or other controls to provide user input to the fields of the form.

The DLTN client receives (730), through the UI of the DLTN client, user input from a user indicating instance data for an instance of the given form. For example, the user input provides values for one or more fields of the given form. The DLTN client sends (735), to the DLTN server, the instance data for the instance of the given form. The instance data can be sent/received in encrypted form over a secure connection.

The DLTN server receives (740), from the DLTN client, instance data from the user for the instance of the given form. The DLTN server stores (745) the instance data for the instance of the given form along with the metadata that defines the given form in the blockchain. For example, the DLTN server stores the instance data for the instance of the given form, along with the metadata that defines the given form, in the blockchain in association with identity of the user who provided the instance data. The DLTN server can add the instance data for the instance of the form in a new block of the blockchain. A copy of the metadata that defines the form can be stored in the same block.

The DLTN server can manage multiple forms available for completion by a user. In this case, the DLTN server can retrieve a list of forms available for completion by the user along with information about the forms, respectively, and then send, to the DLTN client, the list of forms and the information about the forms, respectively. Such information can be sent/received over a secure connection. For a given form, the information about the form can include the title of the form, the owner of the form, the submission status of the form for the user (submitter) (e.g., pending, submitted, reviewed, and approved), and/or the completion status of the form for the user (submitter) (e.g., percentage completed, correction requested).

After receiving the list of forms and information about the forms from the DLTN server, the DLTN client can render, on the UI of the DLTN client, the list of forms available for completion by the user, the information about the forms, respectively, and graphical controls for one or more actions for the forms, respectively. For example, the graphical controls include a graphical control for an action to provide instance data for an instance of a form. The DLTN client can receive, through the UI of the DLTN client, user input from the user indicating selection of a given form for data entry. The DLTN client can then send, to the DLTN server, an indication of the selection. The DLTN server can receive, from the DLTN client, an indication of selection of the form for data entry. In response, the DLTN server sends the metadata that defines the form to the DLTN client for data entry as described with reference to FIGS. 7a and 7b.

Figure 8:
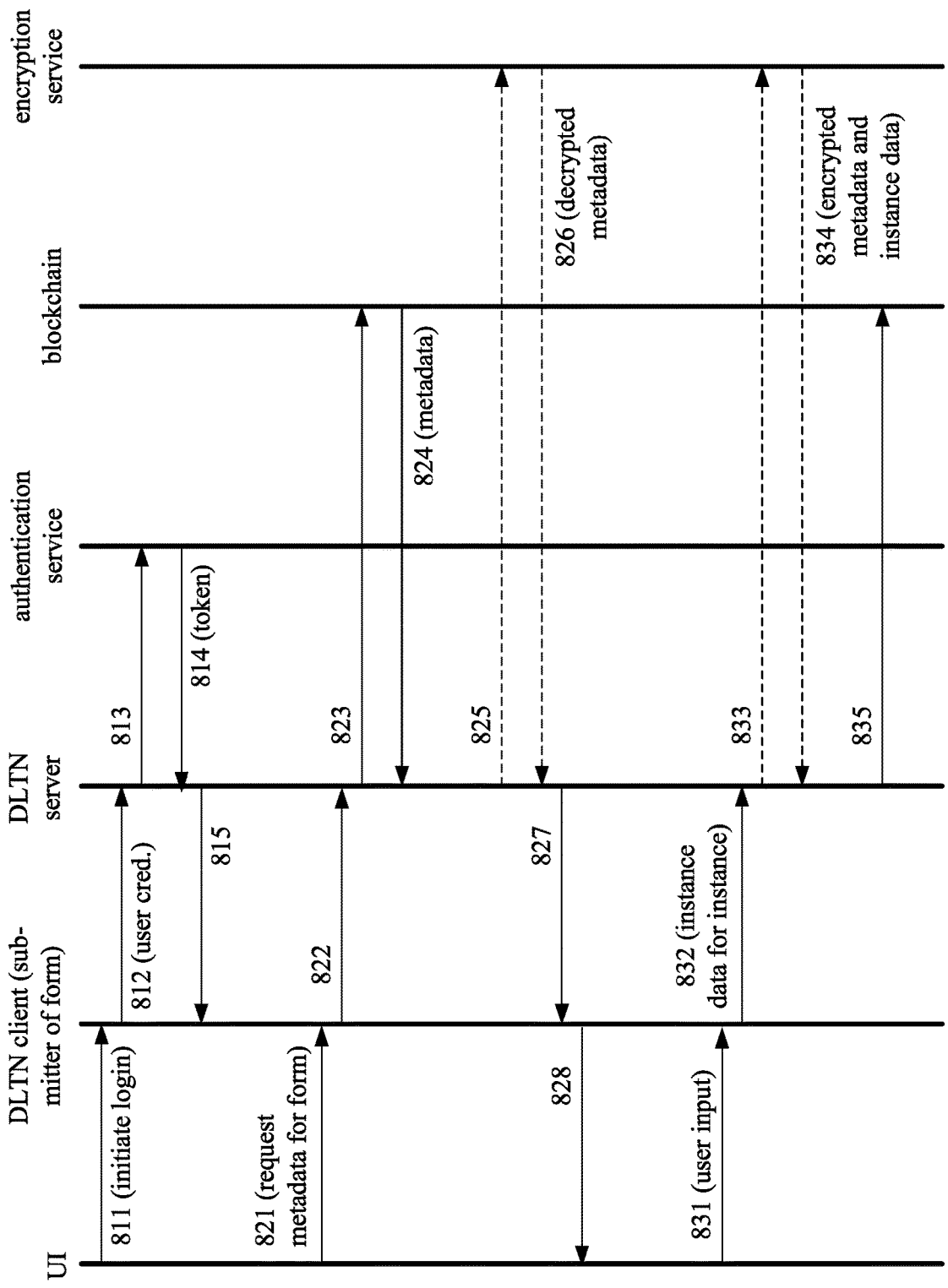
FIG. 8 is a protocol diagram illustrating an example approach to providing instance data for an instance of a form in a DLTN.

FIG. 8 shows an example approach (800) to providing instance data for an instance of a form in a DLTN. The approach includes some of the operations described with reference to FIGS. 7a and 7b as well as operations for user login, decryption, and encryption. In the example approach (800) shown in FIG. 8, communication between a DLTN client and DLTN server can use encrypted messages over a secure connection for a session (e.g., SSL connection). Metadata for a form can be stored in encrypted form using separate encryption keys, which are specific to the owner of the form and managed by an encryption service. Similarly, instance data for an instance of the form can be stored in encrypted form using separate encryption keys, which are specific to the submitter of the instance data and managed by the encryption service.

To start, in a login stage (810), a user, who is the submitter of the instance data for a form, initiates (811) a login process through the UI of a DLTN client. The DLTN client provides (812) credentials of the user to the DLTN server. The DLTN server authenticates (813, 814) the user with an authentication service, which provides a user authentication token to the DLTN server when authentication succeeds. The DLTN server sends (815) a message to the DLTN client, indicating that authentication has succeeded.

In the next stage (820), metadata that defines a given form is requested and presented to the user. Through the UI of the DLTN client, the user requests (821) metadata for a given form. The DLTN client sends (822) the request to the DLTN server, which retrieves (823, 824) the metadata for the given from the blockchain. The metadata can be retrieved in encrypted form, in which case the DLTN server calls (825) an encryption service to decrypt the metadata. To decrypt the metadata, the encryption service uses one or more appropriate user-specific encryption keys for the owner of the form. The encryption service returns (826) the metadata in decrypted form to the DLTN server, which sends (827) the decrypted metadata to the DLTN client. The DLTN client parses the metadata and presents (828) the given form through the UI of the DLTN client.

In the next stage (830), the user (submitter of instance data) provides (831), through the UI of the DLTN client, user input that indicates data entry for one or more fields of the given form. Collectively, the user input provides instance data for an instance of the form. The DLTN client sends (832) the instance data for the instance to the DLTN server. If the instance data is stored in encrypted form, the DLTN server calls (833) the encryption service to encrypt the instance data, and the encryption service returns (834) the instance data in encrypted form. A copy of the metadata that defines the form can be stored along with the instance data. To encrypt the instance data (and the copy of the metadata that defines the form), the encryption service uses one or more appropriate user-specific encryption keys for the user (submitter of instance data for the form). The DLTN server stores (835) the instance data (and copy of the metadata that defines the form) in the blockchain (e.g., in a new block of the blockchain).

E. Examples of Reviewing and Approving Forms

Figure 9A:
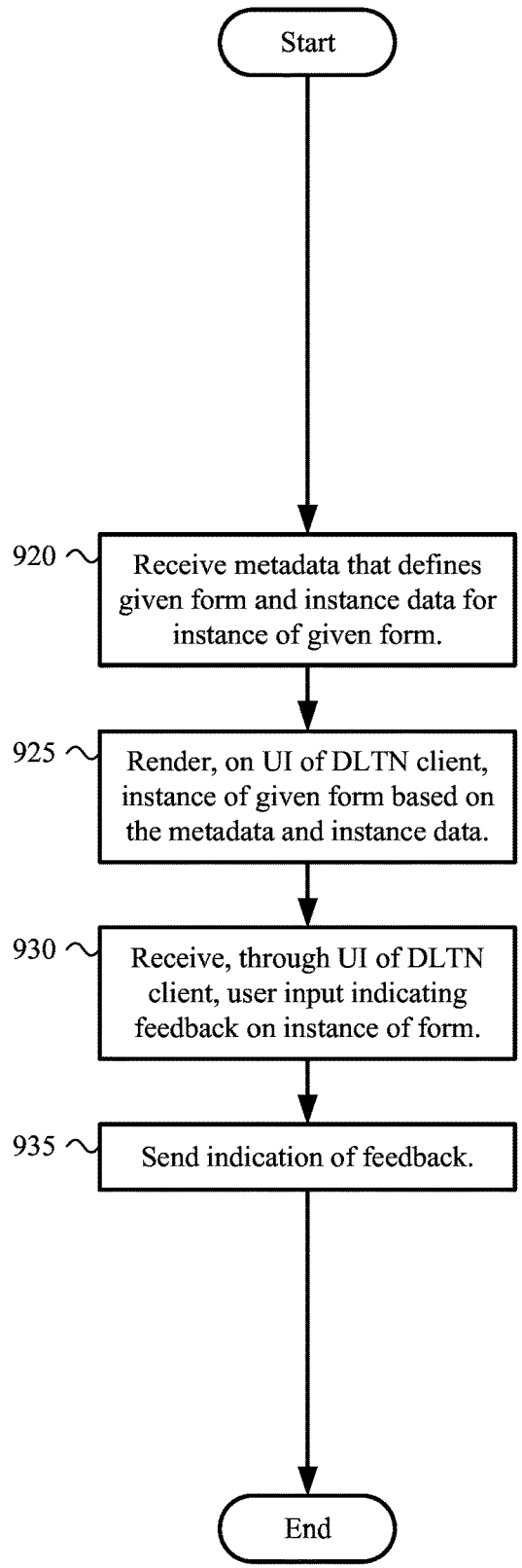
FIGS. 9a and 9b are flowcharts illustrating aspects of a generalized technique for reviewing and approving an instance of a form in a DLTN.
Figure 9B:
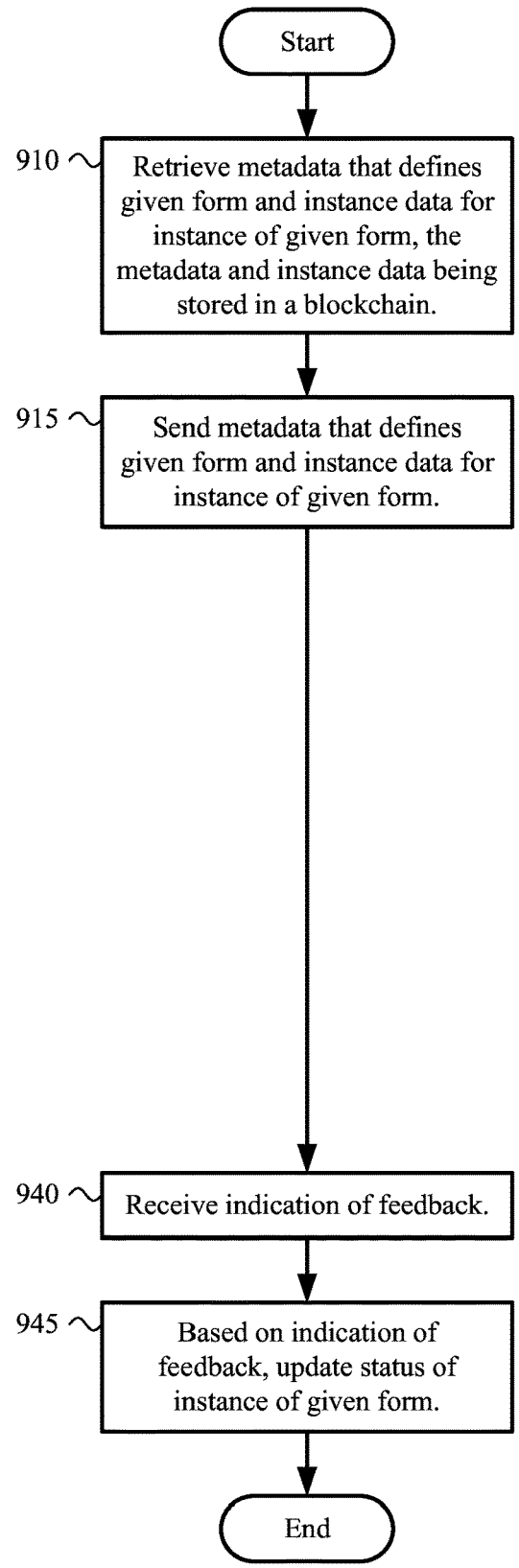

FIG. 9a shows a generalized technique (901) for reviewing and approving an instance of a form in a DLTN, from the perspective of a DLTN client of a given user, who is a reviewer of the instance of the form. FIG. 9b shows a generalized technique (902) for reviewing and approving an instance of a form in a DLTN, from the perspective of a DLTN server. With operations shown in FIGS. 9a and 9b, an instance of a form can be reviewed and approved according to a workflow specified by the owner of the form.

The DLTN server retrieves (910) metadata that defines a given form and instance data for an instance of the given form. The metadata and the instance data for the instance of the given form are stored in a blockchain of the DLTN (e.g., in association with identity of the user who submitted the instance data). The DLTN server sends (915), to the DLTN client, the metadata and the instance data for the instance of the form. The metadata and the instance data can be sent/received in encrypted form over a secure connection. The metadata can define various properties of the given form, such as a title of the form, one or more sections of the form, and one or more fields of the form. For a given field, the metadata can define one or more attributes of the field. The instance data can record user input for the field(s) of the form.

The DLTN client receives (920), from the DLTN server, the metadata that defines the form and the instance data for the instance of the form. The DLTN client renders (925), on the UI of the DLTN client, the instance of the form based on the metadata and the instance data for the instance of the form. The DLTN client can include a form rendering engine (e.g., as part of a Web browser) operable to parse the metadata that defines the given form as well as the instance data, and then perform the rendering of the instance of the form. In addition to displaying information about the form (e.g., title, section(s), field(s), attribute(s) of field(s)) and the instance data provided by the submitter of the form, the DLTN client presents, through the UI of the DLTN client, graphical elements that are operable to provide feedback on the instance of the form. The graphical elements can include text boxes, drop-down menus, select lists, checkboxes, slider controls, and/or other controls to provide feedback on the instance of the form.

The DLTN client receives (930), through the UI of the DLTN client, user input from a user (reviewer) indicating feedback on the instance of the form. For example, the feedback can be approval of the instance of the form or rejection of the instance of the form. Or, the feedback can be a request that information submitted in the instance data be corrected or supplemented. The DLTN client sends (935), to the DLTN server, an indication of the feedback on the instance of the given form. The feedback can be sent/received in encrypted form over a secure connection.

The DLTN server receives (940), from the DLTN client, an indication of the feedback on the instance of the given form. Based on the indication of the feedback on the instance of the given form, the DLTN server updates (945) status of the instance of the given form. For example, the DLTN server stores the status information, along with the metadata that defines the given form and the instance data, in the blockchain in association with identity of the user (reviewer) who provided the feedback. The DLTN server can add the status information in a new block of the blockchain. A copy of the metadata and instance data can be stored in the same block.

The DLTN server can manage multiple instances of forms that are ready for review by a user (reviewer). In this case, the DLTN server can retrieve a list of instances of forms that are ready for review along with information about the instances, respectively, and then send, to the DLTN client, the list of instances of forms that are ready for review along with the information about the instances, respectively. Such information can be sent/received over a secure connection. For a given instance of a form, the information about the instance can include a title of the form, the user (submitter) associated with the instance of the form, the submission status of the form for the user (submitter) (e.g., pending, submitted, reviewed, and approved), the completion status of the form for the user (submitter) (e.g., percentage completed, correction requested), the history of the instance of the form (e.g., a submission event for the instance of the form, a correction request event for the instance of the form, and/or an approval event for the instance of the form). In particular, events in the history of instances of the form can be recorded in blocks in the blockchain, so as to provide an immutable record of the form, submitted instances of the form, and status of the submitted instances at various stages.

After receiving the list of instances of forms and information about the instances from the DLTN server, the DLTN client can render, on the UI of the DLTN client, the list of instances that are ready for review, the information about the instances, respectively, and graphical controls for one or more actions for the instances, respectively. For example, the graphical controls include a graphical control for an action to select an instance of a form for review. The DLTN client can receive, through the UI of the DLTN client, user input from the user (reviewer) indicating selection of an instance of a form for review. The DLTN client can then send, to the DLTN server, an indication of the selection. The DLTN server can receive, from the DLTN client, an indication of selection of the instance of the form for review. In response, the DLTN server sends the metadata that defines the form and the instance data for the instance of the form as described with reference to FIGS. 9*a* and 9*b*.

Figure 10:
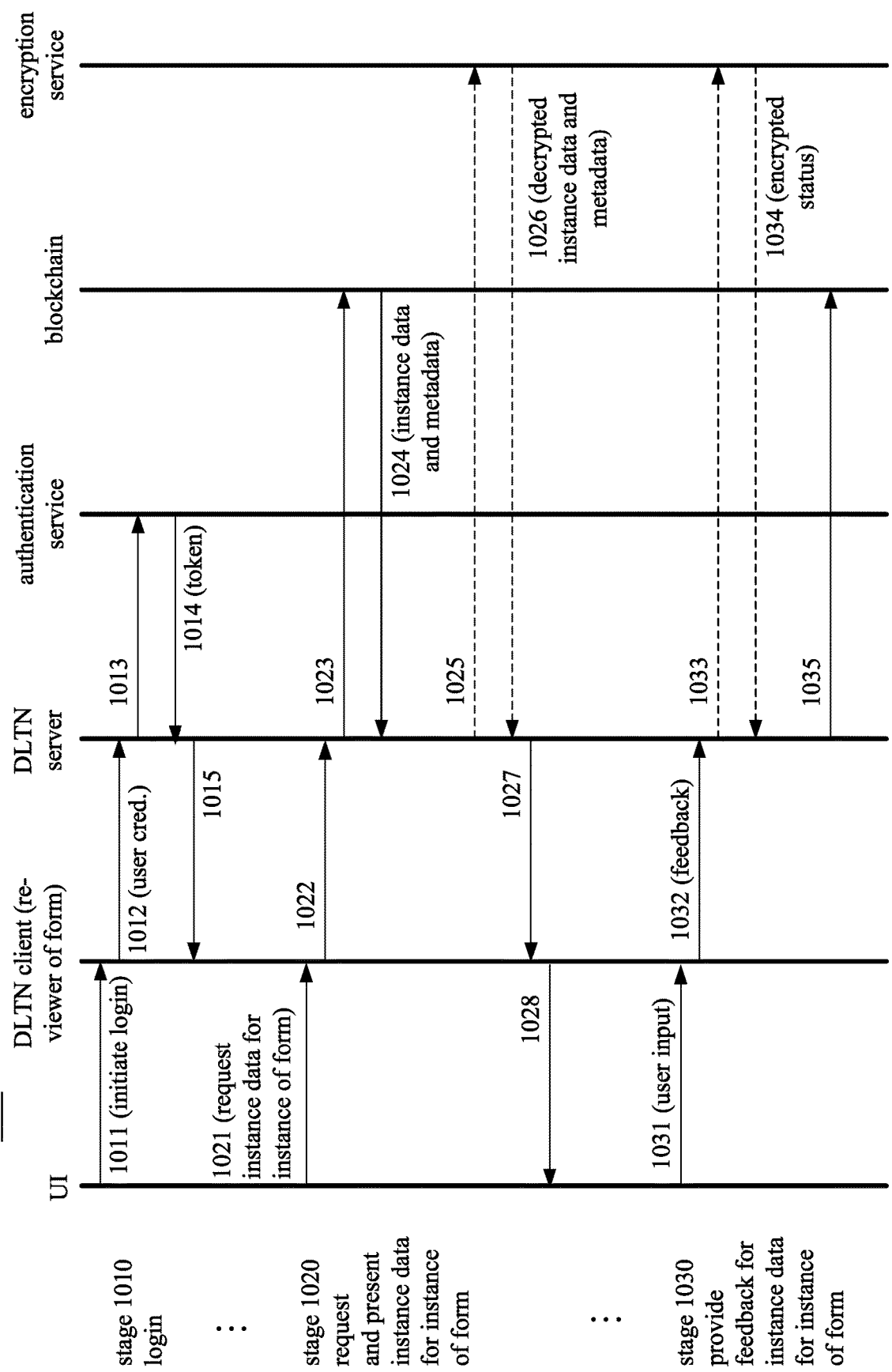
FIG. 10 is a protocol diagram illustrating an example approach to reviewing and approving an instance of a form in a DLTN.

FIG. 10 shows an example approach (1000) to reviewing and approving an instance of a form in a DLTN. The approach includes some of the operations described with reference to FIGS. 9*a* and 9*b* as well as operations for user login, decryption, and encryption. In the example approach (1000) shown in FIG. 10, communication between a DLTN client and DLTN server can use encrypted messages over a secure connection for a session (e.g., SSL connection). Metadata for a form can be stored in encrypted form using separate encryption keys, which are specific to the owner of the form and managed by an encryption service. Similarly, instance data for an instance of the form can be stored in encrypted form using separate encryption keys, which are specific to the submitter of the instance data and managed by the encryption service.

To start, in a login stage (1010), a user, who is a reviewer for an instance of a form, initiates (1011) a login process through the UI of a DLTN client. The DLTN client provides (1012) credentials of the user to the DLTN server. The DLTN server authenticates (1013, 1014) the user with an authentication service, which provides a user authentication token to the DLTN server when authentication succeeds. The DLTN server sends (1015) a message to the DLTN client, indicating that authentication has succeeded.

In the next stage (1020), instance data for an instance of a given form is requested and presented to the user. Through the UI of the DLTN client, the user requests (1021) instance data for an instance of a form. The DLTN client sends (1022) the request to the DLTN server, which retrieves (1023, 1024) the instance data from the blockchain. (The DLTN server also retrieves associated metadata for the form from the blockchain, from the same block or a different block.) The instance data and metadata can be retrieved in encrypted form, in which case the DLTN server calls (1025) an encryption service to decrypt the instance data and metadata. To decrypt the instance data and metadata, the encryption service uses one or more appropriate user-specific encryption keys for the submitter of instance data. (If the metadata is separately encrypted, it can be decrypted using one or more appropriate user-specific encryption keys for the owner of the form.) The encryption service returns (1026) the instance data (and metadata) in decrypted form to the DLTN server, which sends (1027) it to the DLTN client. The DLTN client parses the instance data and metadata and presents (1028) the instance of the form through the UI of the DLTN client.

In the next stage (1030), the user (reviewer) provides (1031), through the UI of the DLTN client, user input that indicates feedback on the instance data for the instance of the form (e.g., approval, rejection, requested corrections, etc.). The DLTN client sends (1032) the feedback to the DLTN server, which determines status information based on the feedback. If the status information is stored in encrypted form, the DLTN server calls (1033) the encryption service to encrypt the status information, and the encryption service returns (1034) the status information in encrypted form. A copy of the metadata that defines the form and instance data for the instance can be stored along with the status information. To encrypt the status information (and the copy of the metadata/instance data), the encryption service uses one or more appropriate user-specific encryption keys for the user (reviewer, and possibly the submitter and/or owner of the form). The DLTN server stores (1035) the status information (and copy of the metadata/instance data) in the blockchain (e.g., in a new block of the blockchain).

F. Example Screenshots

FIGS. 11a-11f are diagrams of example screenshots illustrating different features of managing metadata that defines forms in a DLTN, in some example implementations. In FIGS. 11a-11f, the screenshots show pages rendered in a Web browser (for a DLTN client), with graphical elements provided by a Web application (for a DLTN server).

Figure 11A:
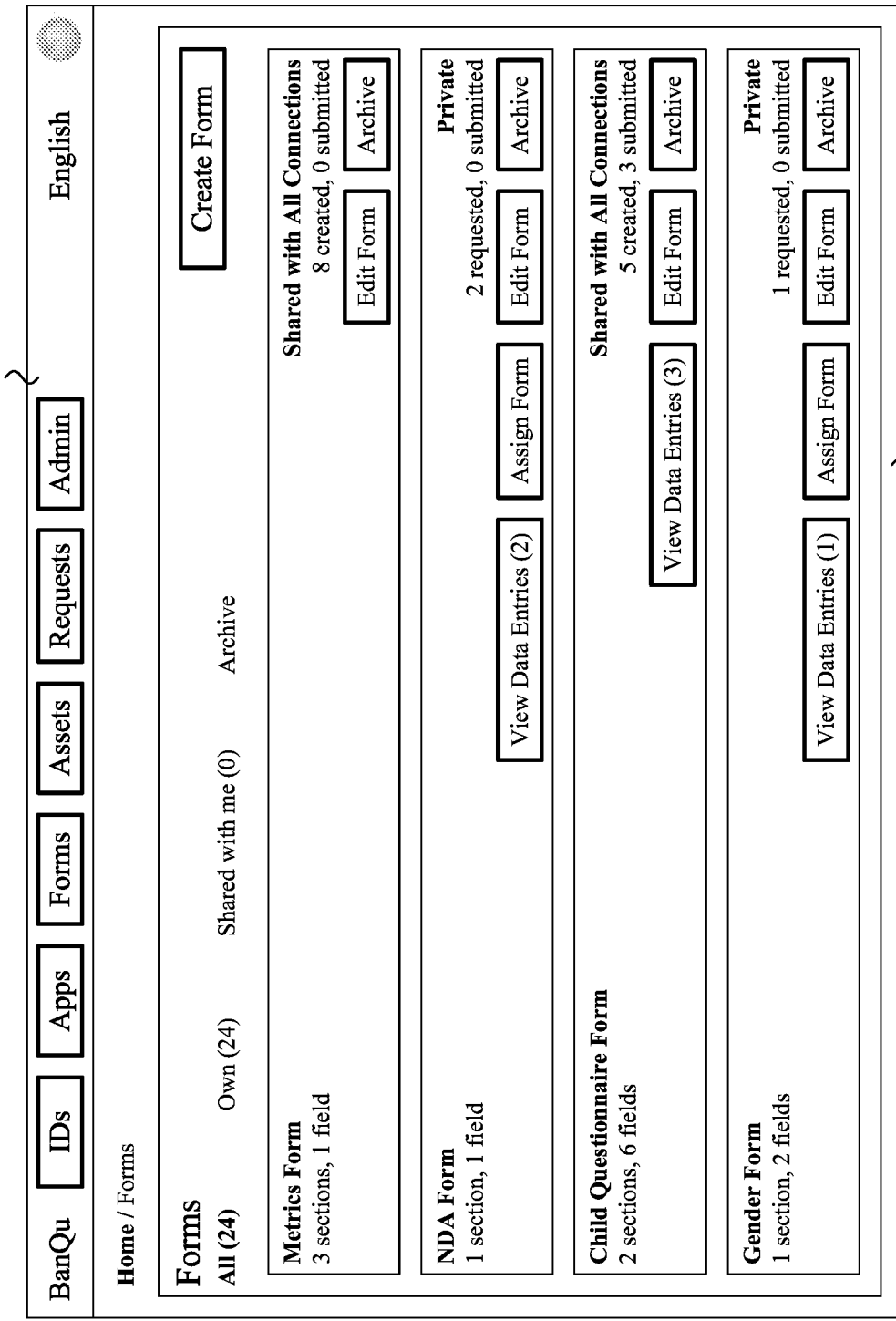

The screenshot (1100) in FIG. 11a shows a list of forms on a page (1101) of a UI of a DLTN client after a user (Coffee Company) has logged in. The top row (1102) includes graphical controls (drop-down menus) that can be actuated to reach menus or pages that show identities associated with the user, available applications, forms (defined by the user, or shared with the user, or archived by the user), assets of the user, requests from the user, and administrative settings. The top row (1102) also includes graphical indicators that indicate the language of the page (1101) and user who has logged in. Below the top row (1102), the page (1101) includes a list of forms. A graphical control ("Create Form" button) can be actuated to create a new form owned by the user. Tabs can be selected to filter which forms are shown in the list—all forms, the user's own forms, forms shared with the user, or archived forms. In FIG. 11a, the "All" tab is selected.

For each form shown in the list, a list entry includes the title of the form, the number of sections in the form, the number of fields in the form, the permission setting for the form (e.g., "Shared with All Connections" or "Private"), status information for the form, and graphical controls that can be actuated to perform an action. The status information can indicate the number of instances of the form that have been created, the number of instances of the form that have been submitted, the number of times the form has been requested, or other information. The graphical controls can be actuated to edit the form ("Edit Form"), archive the form ("Archive"), assign the form to another user in the DLTN for data entry ("Assign Form"), view instance data for instances of the form ("View Data Entries"), or take some other action. If the form is assigned to another user in the DLTN for data entry, for the other user, the given form will appear in a list of forms to be completed by the other user (see, e.g., FIG. 11c).

The screenshot (1110) in FIG. 11b shows a specific form on a page (1111) of a UI of a DLTN client after a user (Coffee Company) has actuated a graphical control to select the form for editing. The top row (1102) is the same as shown in FIG. 11a. Below the top row (1102), the page (1111) includes details about the selected form, which is entitled "Household Questionnaire Form." Tabs can be selected to switch between editing of the metadata of the form ("Editor") and editing of permission settings for the form ("Permissions"). In FIG. 11b, the "Editor" tab is selected. With controls at the bottom of the page (1111), a user can scroll through the form, add or remove a section, add or remove a field, or change a permission setting. For a field, the user can set attributes such as the title of the field, a default value for the field, a description of the field, a JSON field name, a data type for the field (e.g., free text, short text, multi-line text, drop-down menu, country selector, checkbox, radio group, date/time selector, formula, or attachment), an indication of whether validation is required for the field, and an indication of whether a value of the field is required to be unique across submissions. Graphical controls are presented to save the updated metadata for the form or cancel changes to the metadata for the form.

Figure 11C:

The screenshot (1120) in FIG. 11c shows a list of forms on a page (1121) of a UI of a DLTN client after a different user (Farmer Two) has logged in. The top row (1122) includes graphical controls (drop-down menus) that can be actuated to reach menus or pages that show identities associated with the user, available applications, forms, and assets of the user. The top row (1122) also includes graphical indicators that indicate the language of the page (1121) and user who has logged in. Below the top row (1122), the page (1121) includes a list of forms. Tabs can be selected to filter which forms are shown in the list—all forms, forms to be completed by the user ("Pending"), forms previously submitted by the user ("Submitted"), forms submitted by the user that have been reviewed ("Reviewed"), or forms submitted by the user that have been approved ("Approved"). In FIG. 11c, the "Pending" tab is selected to show forms to be completed by the user. A search box can accept user input to search the list of forms. For each form shown in the list, a list entry includes a title, the owner of the form, when the form was created, and the completion status of the form (e.g., percentage completed or correction requested). A form can be selected to provide data entry to fields of the form.

The screenshot (1130) in FIG. 11d shows a specific form on a page (1131) of a UI of a DLTN client after a user (Farmer Two) has selected the form for data entry. The top row (1122) is the same as the page shown in FIG. 11c. Below the top row (1122), the page includes details about the selected form, which is entitled "Child Questionnaire Form." The details include the title of the form and two sections, which are entitled "Baseline Demographics Section" and "Referral Services Section." Each section includes one or more fields for data entry. The page (1131) includes graphical controls that can be actuated to view existing data entries for the form, create a new entry, or close the form. When the user provides data for the fields of the form and saves the form, an instance of the form is created.

The screenshot (1140) in FIG. 11e shows a list of instances of forms on a page (1141) of a UI of a DLTN client after a user (Coffee Company) has logged in. The top row (1102) is the same as shown in FIG. 11a. Below the top row (1102), the page (1141) includes a list of instances of forms. The forms shown are owned by the user, who is also tasked with reviewing instances of the forms. Tabs can be selected to filter which instances of forms are shown in the list—all instances of forms, instances of forms to be completed by other users ("Pending"), instances of forms previously submitted by other users ("Submitted"), instances of forms submitted by other users that have been reviewed ("Reviewed"), or instances of forms submitted by other users that have been approved ("Approved"). In FIG. 11c, the "All" tab is selected to show all instances of forms. A search box can accept user input to search the list of instances of forms. For each instance of a form shown in the list, a list entry includes the title of the form, the user who submitted the instance of the form, and when the form was assigned to the other user or submitted by the other user. The list entry also includes status information about the instance of the form (e.g., percentage completed or correction requested if the instance of the form has not been submitted; approved or rejected if the instance of the form has already been submitted and reviewed.) An instance of a form can be selected to review the instance of the form.

The screenshot (1150) in FIG. 11*f* shows a specific instance of a form on a page (1151) of a UI of a DLTN client after a user (Coffee Company) has selected the instance of the form for review. The top row (1102) is the same as shown in FIG. 11*a*. Below the top row (1102), the page (1151) includes history about the selected instance of the form, which is entitled "Metrics Form." The details include the title of the form, data entries for the history of the form, and history of events for the instance of the form. The events include when an instance of the form was first signed and submitted by the submitter (Farmer Two), when the reviewer (Coffee Company) requested a correction, when the submitter re-signed and re-submitted an instance of the form, and when the reviewer signed and approved the instance of the form.

The innovations described herein include, but are not limited to, the following.

| | Storing Metadata that Defines Forms in a Blockchain |
|---|---|
| A1 | In a computer system that implements a distributed ledger trust network ("DLTN") client configured to interoperate with a DLTN server to access a DLTN, a method comprising:<br>receiving, from the DLTN server, metadata that defines a given form;<br>rendering, on a user interface of the DLTN client, the given form based on the metadata;<br>receiving, through the user interface of the DLTN client, user input from a user indicating one or more updates to the metadata that defines the given form; and<br>sending, to the DLTN server, the one or more updates to the metadata that defines the given form, the metadata that defines the given form being stored in a blockchain of the DLTN. |
| A2 | The method of A1, further comprising:<br>receiving, from the DLTN server, a list of forms owned by the user and information about the forms, respectively, the forms including the given form; and<br>rendering, on the user interface of the DLTN client, the list of forms, the information about the forms, respectively, and graphical controls for one or more actions for the forms, respectively. |
| A3 | The method of A2, further comprising:<br>receiving, through the user interface of the DLTN client, user input from the user indicating a selection of the given form for editing; and<br>sending, to the DLTN server, an indication of the selection, wherein the metadata that defines the given form is received in response to the selection of the given form for editing. |
| A4 | The method of A2, wherein for the given form, the information includes one or more of:<br>title of the given form;<br>a count of sections in the given form;<br>a count of fields in the given form;<br>a permission status of the given form;<br>a count of instances of the given form created by users;<br>a count of instances of the given form requested from users; and<br>a count of instances of the given form submitted by users. |
| A5 | The method of A2, wherein for the given form, the graphical controls for one or more actions include one or more of:<br>a graphical control for an action to view instance data for instances of the given form;<br>a graphical control for an action to assign the given form;<br>a graphical control for an action to edit the given form; and<br>a graphical control for an action to archive the given form. |
| A6 | The method of A1, wherein the DLTN client includes a form rendering engine operable to parse the metadata that defines the given form and perform the rendering of the given form. |
| A7 | In a computer system that implements a distributed ledger trust network ("DLTN") server configured to provide access to a DLTN, a method comprising:<br>sending, to a DLTN client, metadata that defines a given form;<br>receiving, from the DLTN client, one or more updates to the metadata that defines the given form; and<br>based on the one or more updates to the metadata that defines the given form, updating the metadata that defines the given form, the metadata that defines the given form being stored in a blockchain of the DLTN. |
| A8 | The method of A7, further comprising:<br>retrieving a list of forms owned by the user and information about the forms, respectively, the forms including the given form; and<br>sending, to the DLTN client, the list of forms and the information about the forms, respectively. |
| A9 | The method of A8, further comprising:<br>receiving, from the DLTN client, an indication of selection of the given form for editing, wherein the metadata that defines the given form is sent in response to the selection of the given form for editing. |
| A10 | The method of A8, wherein for the given form, the information includes one or more of:<br>title of the given form;<br>a count of sections in the given form;<br>a count of fields in the given form; |

|     |     |
| --- | --- |
|     | a permission status of the given form;<br>a count of instances of the given form created by users;<br>a count of instances of the given form requested from users; and<br>a count of instances of the given form submitted by users. |
| A11 | The method of any one of A1-A10, wherein the metadata that defines the given form includes default, initial values, and wherein the one or more updates to the metadata that defines the given form include:<br>an addition of a title of the given form;<br>an addition of a section of the given form;<br>an addition of a field of the given form; and/or<br>an addition of one or more attributes of a given field of the given form, the one or more attributes including one or more of:<br>a type of the given field, the type being selected from the group consisting of short text, multi-line text, drop-down menu, select list, checkbox, slider, a date/time selector, a formula, or an attachment;<br>a title of the given field;<br>a default value for the given field;<br>a description of the given field;<br>an indication of whether validation is required for the given field; and<br>an indication of whether a value of the given field is required to be unique; and<br>one or more permission settings for the given form. |
| A12 | The method of any one of A1-A10, wherein the metadata that defines the given form includes previously specified values, and wherein the one or more updates to the metadata that defines the given form include:<br>an addition or change to a title of the given form;<br>an addition, change, or removal of a section of the given form;<br>an addition, change, or removal of a field of the given form;<br>an addition, change, or removal of one or more attributes of a given field of the given form, the one or more attributes including one or more of:<br>a type of the given field, the type being selected from the group consisting of short text, multi-line text, drop-down menu, select list, checkbox, slider, a date/time selector, a formula, or an attachment;<br>a title of the given field;<br>a default value for the given field;<br>a description of the given field;<br>an indication of whether validation is required for the given field; and<br>an indication of whether a value of the given field is required to be unique; and<br>one or more permission settings for the given form. |
| A13 | The method of any one of A1-A10, wherein that metadata that defines the given form is stored in the blockchain in association with identity of the user. |

Storing Instance Data for Forms in a Blockchain

|     |     |
| --- | --- |
| B1  | In a computer system that implements a distributed ledger trust network ("DLTN") client configured to interoperate with a DLTN server to access a DLTN, a method comprising:<br>receiving, from the DLTN server, metadata that defines a given form, the metadata that defines the given form being stored in a blockchain of the DLTN;<br>rendering, on a user interface of the DLTN client, the given form based on the metadata;<br>receiving, through the user interface of the DLTN client, user input from a user indicating instance data for an instance of the given form; and<br>sending, to the DLTN server, the instance data for the instance of the given form to be stored in the blockchain along with the metadata that defines the given form. |
| B2  | The method of B1, further comprising:<br>receiving, from the DLTN server, a list of forms available for completion by the user and information about the forms, respectively, the forms including the given form; and<br>rendering, on the user interface of the DLTN client, the list of forms and the information about the forms, respectively. |
| B3  | The method of B2, further comprising:<br>receiving, through the user interface of the DLT client, user input from the user indicating a selection of the given form for data entry; and<br>sending, to the DLT server, an indication of the selection, wherein the metadata that defines the given form is received in response to the selection of the given form for data entry. |
| B4  | The method of B2, wherein for the given form, the information includes one or more of:<br>title of the given form;<br>owner of the given form;<br>submission status of the given form, wherein the submission status of the given form is selected from the group consisting of pending, submitted, reviewed, and approved; and<br>completion status of the given form, wherein the completion status of the given form is selected from the group consisting of percentage completed and correction requested. |

| | |
|---|---|
| B5 | The method of B1, wherein:<br>the metadata that defines the given form is stored in the blockchain in association with identity of an owner of the given form; and<br>the instance data for the instance of the given form, along with the metadata that defines the given form, are to be stored in the blockchain in association with identity of the user. |
| B6 | In a computer system that implements a distributed ledger trust network ("DLTN") server configured to provide access to a DLTN, a method comprising:<br>retrieving metadata that defines a given form, the metadata that defines the given form being stored in a blockchain of the DLTN;<br>sending, to a DLTN client, the metadata that defines a given form;<br>receiving, from the DLTN client, instance data from a user for an instance of the given form; and<br>storing the instance data for the instance of the given form along with the metadata that defines the given form in the blockchain. |
| B7 | The method of B6, further comprising:<br>retrieving a list of forms available for completion by the user and information about the forms, respectively, the forms including the given form; and<br>sending, to the DLTN client, the list of forms and the information about the forms, respectively. |
| B8 | The method of B7, further comprising:<br>receiving, from the DLTN client, an indication of selection of the given form for data entry by the user, wherein the metadata that defines the given form is sent in response to the selection of the given form for data entry. |
| B9 | The method of B7, wherein for the given form, the information includes one or more of:<br>title of the given form;<br>owner of the given form;<br>submission status of the given form, wherein the submission status of the given form is selected from the group consisting of pending, submitted, reviewed, and approved; and<br>completion status of the given form, wherein the completion status of the given form is selected from the group consisting of percentage completed and correction requested. |
| B10 | The method of B6, wherein:<br>the metadata that defines the given form is stored in the blockchain in association with identity of an owner of the given form; and<br>the instance data for the instance of the given form, along with the metadata that defines the given form, are stored in the blockchain in association with identity of the user. |

Feedback on Instance Data for Forms in a Blockchain

| | |
|---|---|
| C1 | In a computer system that implements a distributed ledger trust network ("DLTN") client configured to interoperate with a DLTN server to access a DLTN, a method comprising:<br>receiving, from the DLTN server, metadata that defines a given form and instance data for an instance of the given form, the metadata that defines the given form and the instance data for the instance of the given form being stored in a blockchain of the DLTN;<br>rendering, on a user interface of the DLTN client, the instance of the given form based on the metadata and the instance data for the instance of the given form;<br>receiving, through the user interface of the DLTN client, user input from a user indicating feedback on the instance of the given form; and<br>sending, to the DLTN server, an indication of the feedback on the instance of the given form. |
| C2 | The method of C1, further comprising:<br>receiving, from the DLTN server, a list of instances of forms that are ready for review along with information about the instances, respectively, the forms including the given form; and<br>rendering, on the user interface of the DLTN client, the list of instances of forms and the information about the instances, respectively. |
| C3 | The method of C2, further comprising:<br>receiving, through the user interface of the DLTN client, user input from the user indicating a selection of the instance of the given form for review; and<br>sending, to the DLTN server, an indication of the selection, wherein the metadata that defines the given form and the instance data for an instance of the given form are received in response to the selection of the instance of the given form for review. |
| C4 | The method of C2, wherein for the instance of the given form, the information includes one or more of:<br>title of the given form;<br>user associated with the instance of the given form;<br>submission status of the given form, wherein the submission status of the given form is selected from the group consisting of pending, submitted, reviewed, and approved; |

| | |
|---|---|
| | completion status of the given form, wherein the completion status of the given form is selected from the group consisting of percentage completed and correction requested; and
history of the instance of the given form, including one or more of a submission event for the instance of the given form, a correction request event for the instance of the given form, and an approval event for the instance of the given form. |
| C5 | In a computer system that implements a distributed ledger trust network ("DLTN") server configured to provide access to a DLTN, a method comprising:
retrieve metadata that defines a given form and instance data for an instance of the given form, the metadata that defines the given form and the instance data for the instance of the given form being stored in a blockchain of the DLTN;
sending, to a DLTN client, metadata that defines a given form and instance data for an instance of the given form;
receiving, from the DLTN client, an indication of the feedback on the instance of the given form; and
based on the indication of the feedback on the instance of the given form, updating status of the instance of the given form. |
| C6 | The method of C5, further comprising:
retrieving a list of instances of forms that are ready for review along with information about the instances, respectively, the forms including the given form; and
sending, to the DLTN client, the list of instances of forms that are ready for review along with the information about the instances, respectively. |
| C7 | The method of C6, further comprising:
receiving, from the DLTN client, an indication of selection of the instance of the given form for review, wherein the metadata that defines the given form and the instance data for an instance of the given form are sent in response to the selection of the instance of the given form for review. |
| C8 | The method of C6, wherein for the instance of the given form, the information includes one or more of:
title of the given form;
user associated with the instance of the given form;
submission status of the given form, wherein the submission status of the given form is selected from the group consisting of pending, submitted, reviewed, and approved;
completion status of the given form, wherein the completion status of the given form is selected from the group consisting of percentage completed and correction requested; and
history of the instance of the given form, including one or more of a submission event for the instance of the given form, a correction request event for the instance of the given form, and an approval event for the instance of the given form. |
| C9 | The method of any one of C1-C8, wherein the feedback is selected from the group consisting of approval, rejection, and correction requested. |
| C10 | The method of any one of C1-C8, wherein:
the metadata that defines the given form and the instance data for the instance of the given form are stored in the blockchain in association with identity of the user. |
| | Alternatives and Variations |
| D1 | The method of any one of A1-A13, B1-B10, and C1-C10, wherein:
the DLTN server includes a Web application and implements an application programming interface ("API") accessible to the DLTN client; and
the DLTN client is implemented as a separate executable application, as client-side scripting logic executing in a Web browser environment, or as a set of functions of a Web browser to control client-facing scripting logic executed by the DLTN server. |
| D2 | The method of any one of A1-A13, B1-B10, and C1-C10, further comprising performing operations to log into the DLTN, including:
with the DLTN client:
providing credentials to the DLTN server; and
receiving, from the DLTN server, an authentication token; or
with the DLTN server:
receiving credentials;
validating the credentials; and
sending, to the DLTN client, an authentication token. |
| | Alternate Formats |
| E1 | One or more computer-readable media having stored therein computer-executable instructions for causing a computer system, when programmed thereby, to perform the method of any one of A1-A13, B1-B10, C1-C10, and D1-D2. |
| E2 | A computer system configured to perform the method of any one of A1-A13, B1-B10, C1-C10, and D1-D2. |

The foregoing description discloses only examples. Modifications which fall within the scope of the invention will be readily apparent to those of ordinary skill in the art. In view of the many possible examples to which the principles of the disclosed invention may be applied, it should be recognized that the illustrated examples are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored therein computer-executable instructions for causing a computer system that implements a distributed ledger trust network ("DLTN") server, when programmed thereby, to perform operations to provide access to a DLTN, the operations comprising:

retrieving, from a given block of a blockchain of the DLTN, metadata that defines a given form, wherein the metadata defines attributes of fields of the given form as a custom form;

sending, to a DLTN client, the metadata that defines the given form;

receiving, from the DLTN client, one or more updates to the metadata that defines the given form; and based on the one or more updates to the metadata that defines the given form, updating the metadata that defines the given form, including storing the updated metadata that defines the given form in a new block of the blockchain of the DLTN, the new block being different than the given block, wherein the updated metadata is encrypted using a set of encryption keys that are user-specific and context-specific, the set of encryption keys being one of multiple sets of encryption keys specific to a given user, the given user being an owner of the given form, each of the multiple sets of encryption keys being associated with a different context.

2. The one or more computer-readable media of claim 1, wherein the operations further comprise:

retrieving a list of forms owned by the given user and information about the forms, respectively, the forms including the given form; and sending, to the DLTN client, the list of forms and the information about the forms, respectively.

3. The one or more computer-readable media of claim 2, wherein the operations further comprise:

receiving, from the DLTN client, an indication of selection of the given form for editing, wherein the metadata that defines the given form is sent in response to the selection of the given form for editing.

4. The one or more computer-readable media of claim 1, wherein the metadata that defines the given form further includes default, initial values for the fields, respectively, and wherein the one or more updates to the metadata that defines the given form include:

an addition of a title of the given form;
an addition of a section of the given form;
an addition of a new field of the given form; and/or
an addition of one or more attributes of a given field among the fields of the given form, the one or more added attributes including one or more of:
a title of the given field;
a data type of the given field;
a description of the given field;
an indication of whether validation is required for the given field; and
an indication of whether a value of the given field is required to be unique.

5. The one or more computer-readable media of claim 1, wherein the metadata that defines the given form further includes previously specified values for the fields, respectively, and wherein the one or more updates to the metadata that defines the given form include:

an addition or change to a title of the given form;
an addition, change, or removal of a section of the given form;
an addition, change, or removal of one or more attributes of a given field among the fields of the given form, the one or more added, changed, or removed attributes including one or more of:

a title of the given field;
a data type of the given field;
a description of the given field;
an indication of whether validation is required for the given field; and
an indication of whether a value of the given field is required to be unique.

6. The one or more computer-readable media of claim 1, wherein the metadata that defines the given form is stored in the blockchain in association with identity of the owner of the given form.

7. The one or more computer-readable media of claim 1, wherein:

the DLTN server includes a Web application and implements an application programming interface ("API") accessible to the DLTN client; and the DLTN client is implemented as a separate executable application, as client-side scripting logic executing in a Web browser environment, or as a set of functions of a Web browser to control client-facing scripting logic executed by the DLTN server.

8. The one or more computer-readable media of claim 1, wherein the operations further comprise:

receiving credentials;
validating the credentials; and
sending, to the DLTN client, an authentication token.

9. The one or more computer-readable media of claim 1, wherein the operations further comprise:

calling an encryption service to decrypt the metadata that defines the given form, wherein the decrypted metadata is sent to the DLTN client; and calling the encryption service to encrypt the updated metadata that defines the given form, wherein the encrypted updated metadata is stored in the new block of the blockchain.

10. The one or more computer-readable media of claim 1, wherein, for each of the multiple sets of encryption keys, the different context is a different subset of other users.

11. A computer system comprising memory and one or more processing units, wherein the memory stores computer-executable instructions for causing the computer system, when programmed thereby, to implement a distributed ledger trust network ("DLTN") server configured to perform operations comprising:

retrieving metadata that defines a given form, the metadata that defines the given form being stored in a given block of a blockchain of the DLTN, wherein the metadata defines fields of the given form as a custom form;

sending, to a DLTN client, the metadata that defines the given form;

receiving, from the DLTN client, instance data from a user for an instance of the given form, wherein the instance data includes values provided by data entry to the fields of the given form for the instance of the given form; and storing the instance data for the instance of the given form along with a copy of the metadata that defines the given form in a new block of the blockchain, the new block being different than the given block, the instance data being encrypted using a set of encryption keys that are user-specific and context-specific, the set of encryption keys being one of multiple sets of encryption keys specific to the user, each of the multiple sets of encryption keys being associated with a different context.

12. The computer system of claim 11, wherein the operations further comprise:
retrieving a list of forms available for completion by the user and information about the forms, respectively, the forms including the given form; and
sending, to the DLTN client, the list of forms and the information about the forms, respectively.

13. The computer system of claim 12, wherein the operations further comprise:
receiving, from the DLTN client, an indication of selection of the given form for data entry by the user, wherein the metadata that defines the given form is sent in response to the selection of the given form for data entry.

14. The computer system of claim 12, wherein for the given form, the information about the forms includes one or more of:
title of the given form;
owner of the given form;
submission status of the given form, wherein the submission status of the given form is selected from the group consisting of pending, submitted, reviewed, and approved; and
completion status of the given form, wherein the completion status of the given form is selected from the group consisting of percentage completed and correction requested.

15. The computer system of claim 11, wherein:
the metadata that defines the given form is stored in the blockchain in association with identity of an owner of the given form; and
the instance data for the instance of the given form, along with the copy of the metadata that defines the given form, are stored in the blockchain in association with identity of the user.

16. The computer system of claim 11, wherein:
the DLTN server includes a Web application and implements an application programming interface ("API") accessible to the DLTN client; and
the DLTN client is implemented as a separate executable application, as client-side scripting logic executing in a Web browser environment, or as a set of functions of a Web browser to control client-facing scripting logic executed by the DLTN server.

17. The computer system of claim 11, wherein the operations further comprise:
calling an encryption service to decrypt the metadata that defines the given form, wherein the decrypted metadata is sent to the DLTN client; and
calling the encryption service to encrypt the instance data for the instance of the given form, wherein the encrypted instance data is stored in the new block of the blockchain.

18. The computer system of claim 11, wherein the metadata defines attributes of the fields of the given form, the attributes including, for a given field among the fields of the given form, a title of the given field and a data type of the given field.

19. The computer system of claim 11, wherein, for each of the multiple sets of encryption keys, the different context is a different subset of other users.

20. A method in a computer system that implements a distributed ledger trust network ("DLTN") server configured to provide access to a DLTN, the method comprising:
retrieving metadata that defines a given form and instance data for an instance of the given form, the metadata that defines the given form and the instance data for the instance of the given form being stored in a given block of a blockchain of the DLTN, wherein the metadata defines attributes of fields of the given form as a custom form, and wherein the instance data includes values provided by data entry to the fields of the given form for the instance of the given form;
sending, to a DLTN client, the metadata that defines the given form and the instance data for the instance of the given form;
receiving, from the DLTN client, an indication of feedback on the instance of the given form; and
based on the indication of the feedback on the instance of the given form, updating status of the instance of the given form, including storing status information that indicates the updated status in a new block of the blockchain, the new block being different than the given block, the status information being encrypted using a set of encryption keys that are user-specific and context-specific, the set of encryption keys being one of multiple sets of encryption keys specific to a given user, the given user being a reviewer of the instance of the given form, each of the multiple sets of encryption keys being associated with a different context.

21. The method of claim 20, further comprising:
retrieving a list of instances of forms that are ready for review along with information about the instances, respectively, the forms including the given form; and
sending, to the DLTN client, the list of instances of forms that are ready for review along with the information about the instances, respectively.

22. The method of claim 21, further comprising:
receiving, from the DLTN client, an indication of selection of the instance of the given form for review, wherein the metadata that defines the given form and the instance data for the instance of the given form are sent in response to the selection of the instance of the given form for review.

23. The method of claim 20, wherein the feedback is selected from the group consisting of approval, rejection, and correction requested.

24. The method of claim 20, wherein:
the metadata that defines the given form and the instance data for the instance of the given form are stored in the blockchain in association with identity of another user, the other user being a submitter of the instance data for the instance of the given form.

25. The method of claim 20, further comprising:
receiving credentials;
validating the credentials; and
sending, to the DLTN client, an authentication token.

26. The method of claim 20, further comprising:
calling an encryption service to decrypt the metadata that defines the given form, wherein the decrypted metadata is sent to the DLTN client;
calling the encryption service to decrypt the instance data for the instance of the given form, wherein the decrypted instance data is sent to the DLTN client; and
calling the encryption service to encrypt the status information, wherein the encrypted status information is stored in the new block of the blockchain.

27. The method of claim 20, wherein, for each of the multiple sets of encryption keys, the different context is a different subset of other users.

* * * * *